(12) United States Patent
Bowers et al.

(10) Patent No.: US 7,872,812 B2
(45) Date of Patent: Jan. 18, 2011

(54) EMITTING AND FOCUSING APPARATUS, METHODS, AND SYSTEMS

(75) Inventors: Jeffrey A. Bowers, Kirkland, WA (US); Roderick A. Hyde, Redmond, WA (US); Edward K. Y. Jung, Bellevue, WA (US); John Brian Pendry, Surrey (GB); David Schurig, Raleigh, NC (US); David R. Smith, Durham, NC (US); Clarence T. Tegreene, Bellevue, WA (US); Thomas A. Weaver, San Mateo, CA (US); Charles Whitmer, North Bend, WA (US); Lowell L. Wood, Jr., Bellevue, WA (US)

(73) Assignee: The Invention Science Fund I, LLC

( * ) Notice: Subject to any disclaimer, the term of this patent is extended or adjusted under 35 U.S.C. 154(b) by 158 days.

(21) Appl. No.: 12/283,352

(22) Filed: Sep. 10, 2008

(65) Prior Publication Data
US 2009/0316279 A1    Dec. 24, 2009

Related U.S. Application Data

(63) Continuation-in-part of application No. 12/214,534, filed on Jun. 18, 2008, and a continuation-in-part of application No. 12/156,443, filed on May 30, 2008.

(51) Int. Cl.
*G02B 13/00* (2006.01)
(52) U.S. Cl. ..................................... 359/724; 359/721
(58) Field of Classification Search ................. 359/724, 359/721, 672, 676
See application file for complete search history.

(56) References Cited

U.S. PATENT DOCUMENTS

| | | | |
|---|---|---|---|
| 4,105,955 A | 8/1978 | Hayashi et al. | |
| 4,143,944 A | 3/1979 | Takahashi | |
| 4,638,322 A | 1/1987 | Lamberty | |
| 4,700,196 A | 10/1987 | Campbell et al. | |
| 4,844,617 A | 7/1989 | Kelderman et al. | |
| 4,872,743 A | 10/1989 | Baba et al. | |
| 4,989,006 A | 1/1991 | Roth | |
| 5,013,143 A | 5/1991 | Pasco | |
| 5,386,215 A | 1/1995 | Brown | |
| 5,563,739 A | 10/1996 | Sato | |
| 5,774,249 A | 6/1998 | Shiraishi et al. | |

(Continued)

FOREIGN PATENT DOCUMENTS

EP       2 019 447 A1     1/2009

(Continued)

OTHER PUBLICATIONS

U.S. Appl. No. 11/982,353, John Brian Pendry et al.

(Continued)

*Primary Examiner*—Timothy J Thompson

(57) ABSTRACT

Apparatus, methods, and systems provide emitting, field-adjusting, and focusing of electromagnetic energy. In some approaches the field-adjusting includes providing an extended depth of field greater than a nominal depth of field. In some approaches the field-adjusting includes field-adjusting with a transformation medium, where the transformation medium may include an artificially-structured material such as a metamaterial.

53 Claims, 8 Drawing Sheets

U.S. PATENT DOCUMENTS

| | | | |
|---|---|---|---|
| 5,784,507 A | 7/1998 | Holm-Kennedy et al. | |
| 5,911,018 A | 6/1999 | Bischel et al. | |
| 5,956,447 A | 9/1999 | Zel'Dovich et al. | |
| 6,072,889 A | 6/2000 | Deaett et al. | |
| 6,078,946 A | 6/2000 | Johnson | |
| 6,117,517 A | 9/2000 | Diaz et al. | |
| 6,118,908 A | 9/2000 | Bischel et al. | |
| 6,335,835 B1 | 1/2002 | Koike | |
| 6,337,125 B1 | 1/2002 | Diaz et al. | |
| 6,441,771 B1 | 8/2002 | Victora | |
| 6,456,252 B1 | 9/2002 | Goyette | |
| 6,512,483 B1 | 1/2003 | Holden et al. | |
| 6,520,643 B1* | 2/2003 | Holman et al. | 353/20 |
| 6,525,875 B1 | 2/2003 | Lauer | |
| 6,597,006 B1 | 7/2003 | McCord et al. | |
| 6,690,336 B1 | 2/2004 | Leisten et al. | |
| 6,714,061 B2 | 3/2004 | Hareland | |
| 6,870,671 B2 | 3/2005 | Travis | |
| 6,999,044 B2 | 2/2006 | Durham et al. | |
| 7,006,052 B2 | 2/2006 | Delgado et al. | |
| 7,218,285 B2 | 5/2007 | Davis et al. | |
| 7,339,539 B2 | 3/2008 | Joannopoulos et al. | |
| 7,348,930 B2 | 3/2008 | Lastinger et al. | |
| 7,352,941 B2 | 4/2008 | Bratkovski et al. | |
| 7,411,736 B2 | 8/2008 | Tsukagoshi | |
| 7,463,433 B2 | 12/2008 | Tang | |
| 7,489,282 B2 | 2/2009 | Lastinger et al. | |
| 7,529,030 B2 | 5/2009 | Nishioka | |
| 7,535,171 B2 | 5/2009 | Bernkopf | |
| 7,535,660 B2 | 5/2009 | Saito | |
| 7,554,741 B2 | 6/2009 | Hamada | |
| 7,675,594 B2 | 3/2010 | Lee et al. | |
| 7,777,962 B2 | 8/2010 | Bowers et al. | |
| 2002/0149534 A1 | 10/2002 | Bobier | |
| 2004/0066251 A1 | 4/2004 | Eleftheriades et al. | |
| 2004/0091222 A1 | 5/2004 | Canning et al. | |
| 2004/0254474 A1 | 12/2004 | Seibel et al. | |
| 2005/0099348 A1 | 5/2005 | Pendry | |
| 2005/0221128 A1 | 10/2005 | Kochergin | |
| 2005/0225492 A1 | 10/2005 | Metz | |
| 2005/0253667 A1 | 11/2005 | Itoh et al. | |
| 2006/0039072 A1 | 2/2006 | Ruoff et al. | |
| 2006/0115212 A1 | 6/2006 | Yanik et al. | |
| 2006/0121358 A1 | 6/2006 | Rich et al. | |
| 2006/0125681 A1 | 6/2006 | Smith et al. | |
| 2006/0214113 A1 | 9/2006 | Kleinerman | |
| 2007/0109023 A1 | 5/2007 | Beausoliel et al. | |
| 2007/0124122 A1 | 5/2007 | Freier | |
| 2007/0188385 A1 | 8/2007 | Hyde et al. | |
| 2007/0188397 A1 | 8/2007 | Parsche | |
| 2007/0201805 A1* | 8/2007 | Hamada | 385/131 |
| 2007/0236769 A1 | 10/2007 | Zalevsky | |
| 2007/0285314 A1 | 12/2007 | Mortazawi et al. | |
| 2008/0024792 A1 | 1/2008 | Pendry et al. | |
| 2008/0052904 A1 | 3/2008 | Schneider et al. | |
| 2008/0079638 A1 | 4/2008 | Choi et al. | |
| 2009/0040132 A1 | 2/2009 | Sridhar et al. | |
| 2009/0116096 A1* | 5/2009 | Zalevsky et al. | 359/256 |
| 2009/0285531 A1* | 11/2009 | Hirose | 385/43 |

FOREIGN PATENT DOCUMENTS

| | | |
|---|---|---|
| GB | 2 382 230 A | 5/2003 |
| WO | WO 02/49146 A3 | 6/2002 |
| WO | WO 03/088419 A1 | 10/2003 |
| WO | WO 2004/093155 A3 | 10/2004 |
| WO | WO 2006/023195 A2 | 3/2006 |
| WO | WO 2008/115881 A1 | 9/2008 |
| WO | WO 2008/137509 A1 | 11/2008 |

OTHER PUBLICATIONS

U.S. Appl. No. 12/069,170, John Brian Pendry et al.
U.S. Appl. No. 12/074,247, Jordin T. Kare.
U.S. Appl. No. 12/074,248, Jordin T. Kare.
U.S. Appl. No. 12/156,443, Jeffrey A. Bowers et al.
U.S. Appl. No. 12/220,705, Jeffrey A. Bowers et al.
U.S. Appl. No. 12/220,703, Jeffrey A. Bowers et al.
U.S. Appl. No. 12/221,198, Jeffrey A. Bowers et al.
U.S. Appl. No. 12/221,201, Jeffrey A. Bowers et al.
U.S. Appl. No. 12/228,140, Jeffrey A. Bowers et al.
U.S. Appl. No. 12/228,153, Jeffrey A. Bowers et al.
Alvey, Graham R. et al.; "Investigation Into Techniques for Packaging Cosite Microstrip Patch Antennas Into Handheld Devices"; Antenna Technology Small Antennas and Novel Metamaterials, 2006 IEEE International Workshop; Mar. 6-8, 2006; pp. 45-48.
Balanis, Constantine A.; *Antenna Theory: Analysis and Design*; 2005; 1136 pages; 3$^{rd}$ Edition; ISBN 047166782X; Wiley-Interscience (not provided).
Barkovskii, L.M. et al..; "The Impedance Tensor for Electromagnetic Waves In Anisotropic Media"; Journal of Applied Spect.; 1974; pp. 836-837; 20 (6); Plenum Publishing Corporation.
Cai, Wenshan et al.; "Nonmagnetic Cloak with Minimized Scattering"; Applied Physics Letters; Published Online Sep. 11, 2007; pp. 111105-1 to 111105-3; vol. 91; American Institute of Physics.
Cai, Wenshan et al.; "Optical Cloaking with Metamaterials"; Nature Photonics; Apr. 2007; pp. 224-227; vol. 1; Nature Publishing Group.
Caloz, Christophe et al.; *"Electromagnetic Metamaterials Transmission Line Theory and Microwave Applications"*; 2006; 352 pages; ISBN 0471669857; Wiley-Interscience (not provided).
Chen, Hongsheng et al.; Metamaterial Exhibiting Left-Handed Properties Over Multiple Frequency Bands; Journal of Applied Physics; Nov. 1, 2004; pp. 5338-5340; vol. 96, No. 9; American Institute of Physics.
Cummer, Steven A. et al.; "Full-Wave Simulations of Electromagnetic Cloaking Structures"; Physical Review E; 2006; pp. 036621-1 to 036621-5; vol. 74; The American Physical Society.
Dewar, G.; "A Thin Wire Array and Magnetic Host Structure with n<0"; Journal of Applied Physics; 2005; pp. 10Q101-1 to 10Q101-3; vol. 97; American Institute of Physics.
Efimov, S.P.; "Compression of Electromagnetic Waves by Anisotropic Media ('Nonreflecting' Crystal Model)"; Radiophysics and Quantum Electronics; Sep. 1978; pp. 916-920; vol. 21, No. 9; Springer New York.
Engheta, Nader et al.; *Metamaterials Physics and Engineering Explorations*; 2006; 414 pages; ISBN 139780471761020; John Wiley & Sons, Inc. (not provided).
Enoch, Stefan et al.; "A Metamaterial for Directive Emission"; Physical Review Letters; Nov. 18, 2002; pp. 213902-1 to 213902-4; vol. 89, No. 21; The American Physical Society.
Georgakopoulos, Stavros V. et al.; "Cosite Interference Between Wire Antennas on Helicopter Structures and Rotor Modulation Effects: FDTD Versus Measurements"; IEEE Transactions on Electromagnetic Compatibility; Aug. 1999; pp. 221-233; vol. 41, No. 3; IEEE.
Ghose, Rabindra N.; "Collocation of Receivers and High-Power Broadcast Transmitters"; IEEE Transactions on Broadcasting; Jun. 1988; pp. 154-158; vol. 34, No. 2; IEEE.
Hoffman, Anthony J. et al.; "Negative refraction in semiconductor metamaterials"; Nature Materials; Dec. 2007; pp. 946-950; vol. 6; Nature Publishing Group.
Holden, Anthony; "Inside the Wavelength: Electromagnetics in the Near Field"; Foresight Exploiting the Electromagnetic Spectrum State of the Science Review; pp. 1-57; located at: http://www.foresight.gov.uk/Previous_Projects/Exploiting_the_electromagnetic_spectrum/Reports_and_Publications/State_of_the_science_reviews/Inside_the_wavelength/EEMS_Inside_the_wavelength.pdf.
Jacob, Zubin et al.; "Optical Hyperlens: Far-field imaging beyond the diffraction limit"; Optics Express; Sep. 4, 2006; pp. 8247-8256; vol. 14, No. 18; OSA.

Joannopoulos, John D. et al.; "*Photonic Crystals: Molding the Flow of Light (Second Edition)*"; 2008; 304 pages; ISBN-10: 0691124566; Princeton University Press (not provided).

Kildishev, Alexander et al.; "Engineering space for light via transformation optics"; Optics Letters; Jan. 1, 2008; pp. 43-45; vol. 33, No. 1; Optical Society of America.

Kraus, John D.; Marhefka, Ronald J.; *Antennas For All Applications*; 2001; 960 pages; 3rd Edition; ISBN 0072321032; McGraw-Hill Science/Engineering/Math (not provided).

Le, Anh Q. et al.; "An Evaluation of Collocation Interference Mitigation Approach for Shipboard SINCGARS Radios"; Military Communications Conference; Nov. 7, 1995; pp. 612-616; vol. 2; IEEE.

Leonhardt, Ulf; Philbin, Thomas G.; "General Relativity in Electrical Engineering"; New Journal of Physics; 2006; pp. 1-18; vol. 8, No. 247; IOP Publishing Ltd and Deutsche Physikalische Gesellschaft.

Li, Shing Ted et al.; "EMC Analysis of a Shipboard Frequency-Hopping Communication System"; Electromagnetic Compatibility 1996, Symposium Record., IEEE 1996 International Symposium; Aug. 19-23, 1996; pp. 219-224; IEEE.

Linden, Stefan et al.; "Photonic Metamaterials: Magnetism at Optical Frequencies"; IEEE Journal of Selected Topics in Quantum Electronics; Nov./Dec. 2006; pp. 1097-1 105; vol. 12, No. 6; IEEE.

Luukkonen, Olli; "Antenna Performance Enhancement Using Complex Materials"; pp. 1-8; located at: http://www.tkk.fi/Yksikot/Sahkomagnetiikka/kurssit/S-96.4620_2006/reports/antenna2.pdf.

Pendry, J.B. et al.; "Controlling Electromagnetic Fields"; Science; Jun. 23, 2006; pp. 1780-1782 (8 Total Pages including Supporting Material); vol. 312; located at: www.sciencemag.org.

Pendry, J.B.; Ramakrishna, S.A.; "Focusing Light Using Negative Refraction"; J. Phys. [Condensed Matter]; 2003; pp. 6345-6364 (pp. 1-22); vol. 15.

Pendry, J.B. et al.; "Magnetism from Conductors and Enhanced Nonlinear Phenomena"; IEEE Transactions on Microwave Theory and Techniques; Nov. 1999; pp. 2075-2084; vol. 47, No. 11; IEEE.

Rahm, Marco et al.; "Optical Design of Reflectionless Complex Media by Finite Embedded Coordinate Transformations"; Physical Review Letters; Feb. 15, 2008; pp. 063903-1-063903-4; 100, 063903 (2008); The American Physical Society.

Rahmat-Samii, Yahya; "Metamaterials in Antenna Applications: Classifications, Designs and Applications"; Antenna Technology Small Antennas and Novel Metamaterials, 2006 IEEE International Workshop; Mar. 6-8, 2006; pp. 1-4; IEEE.

Rill, Michael S. et al.; "Photonic metamaterials by direct laser writing and silver chemical vapour deposition"; Nature Materials; Advance Online Publication; May 11, 2008; pp. 1-4; Nature Publishing Group.

Sacks, Zachary S. et al.; "A Perfectly Matched Anisotropic Absorber for Use as an Absorbing Boundary Condition"; IEEE Transactions on Antennas and Propagation; Dec. 1995; pp. 1460-1463; vol. 43, No. 12; IEEE.

Salandrino, Alessandro et al.; "Far-field subdiffraction optical microscopy using metamaterial crystals: Theory and simulations"; Physical Review; Aug. 15, 2006; pp. 075103-1-075103-5; 74, 075103 (2006); The American Physical Society.

Sarychev, Andrey K. et al.; *Electrodynamics of Metamaterials*; 2007; 247 pages; ISBN 139789810242459; World Scientific Publishing Co. Pte. Ltd. (not provided).

Schurig, D. et al.; "Calculation of Material Properties and Ray Tracing in Transformation Media"; Optics Express; Oct. 16, 2006; pp. 9794-9804; vol. 14, No. 21; OSA.

Schurig, D. et al.; "Metamaterial Electromagnetic Cloak at Microwave Frequencies"; Science; Nov. 10, 2006; pp. 977-980 (18 Total pages including Supporting Material); vol. 314; located at: www.sciencemag.org.

Schurig, D. et al.; "Transformation-designed optical elements"; Optics Express; Oct. 29, 2007; pp. 14772-14782; vol. 15, No. 22; OSA.

Shalaev, Vladimir M.; "Optical Negative-Index Metamaterials"; Nature Photonics: Jan. 2007; pp. 41-48; vol. 1; Nature Publishing Group.

Sievenpiper, Dan et al.; "High-Impedance Electromagnetic Surfaces with a Forbidden Frequency Band"; IEEE Transactions on Microwave Theory and Techniques; Nov. 1999; pp. 2059-2074; vol. 47, No. 11; IEEE.

Smith, D.R.; Schurig, D.; "Electromagnetic Wave Propagation in Media with Indefinite Permittivity and Permeability Tensors"; Physical Review Letters; Feb. 21, 2003; pp. 077405-1 to 077405-4; vol. 90, No. 7; The American Physical Society.

Smith, D.R. et al.; "Metamaterials and Negative Refractive Index"; Science; Aug. 6, 2004; pp. 788-792; vol. 305; located at: www.sciencemag.org.

Sohn, J.R. et al.; "Comparative Study on Various Artificial Magnetic Conductors for Low-Profile Antenna"; Progress in Electromagnetics Research; 2006; pp. 27-37; vol. 61; located at: http://ceta.mit.edu/PIER/pier61/02.0601171.SK.Tae.L.pdf.

Travis, G.W.; Lenzing, H.F.; "Shipboard HF Interference: Problems and Mitigation"; Military Communications Conference 1989, MILCOM '89, Conference Record. 'Bridging the Gap Interoperability, Survivability, Security'; Oct. 15-18, 1989; pp. 106-110; vol. 1; IEEE.

Venskauskas, Kostas et al.; "Interference Cancellation Systems for Electromagnetically Dense Platforms"; Antennas and Propagation Society International Symposium, 1999; Aug. 1999; pp. 1612-1615; vol. 3; IEEE.

Ward, A.J.; Pendry, J.B.; "Refraction and Geometry in Maxwell's Equations"; Journal of Modern Optics; 1996; pp. 773-793; vol. 43.

Yang, Fan; Rahmat-Samii, Yahya; "Microstrip Antennas Integrated with Electromagnetic Band-Gap (EBG) Structures: A Low Mutual Coupling Design for Array Applications"; IEEE Transactions on Antennas and Propagation; Oct. 2003; pp. 2936-2946; vol. 51, No. 10; IEEE.

Yang, Fan; Rahmat-Samii, Yahya; "Reflection Phase Characterizations of the EBG Ground Plane for Low Profile Wire Antenna Applications"; IEEE Transactions on Antennas and Propagation; Oct. 2003; pp. 2691-2703; vol. 51, No. 10; IEEE.

Zharov, Alexander A. et al.; "Birefringent Left-Handed Metamaterials and Perfect Lenses for Vectorial Fields"; New Journal of Physics; 2005; pp. 1-9; vol. 7; IOP Publishing Ltd. and Deutsche Physikalische Gesellschaft.

U.S. Appl. No. 12/231,681, Jeffrey A. Bowers et al.
U.S. Appl. No. 12/288,653, Bowers et al.
U.S. Appl. No. 12/288,625, Bowers et al.
U.S. Appl. No. 12/288,428, Bowers et al.
U.S. Appl. No. 12/288,423, Bowers et al.
U.S. Appl. No. 12/286,608, Bowers et al.
U.S. Appl. No. 12/286,444, Bowers et al.
U.S. Appl. No. 12/286,387, Bowers et al.
U.S. Appl. No. 12/286,301, Bowers et al.

Kshertrimayum, R.S.; "A brief intro to metamaterials"; IEEE Potentials; bearing a date of Dec. 2004-Jan. 2005; vol. 23, Issue 5; pp. 44-46; IEEE.

Kwon, Do-Noon, Werner, Douglas H.; "Restoration of antenna parameters in scattering environments using electromagnetic cloaking"; Applied Physics Letters 92; bearing a date of 2008; pp. 1-3; American Institute of Physics.

Pendry, John; "Metamaterials open new horizons in electromagnetism"; publication date unknown; Imperial College London; located at www.ecti.utoronto.ca/Assets/Events/PendryDispEng,pdf.

Vardaxoglou et al.; "Recent advances on Metamaterials with applications in terminal and high gain array and reflector antennas"; bearing a date of 2006; IEEE; pp. 423-426.

UK Intellectual Property Office; Patent Act 1977: Search Report under Sections 17; App. No. GB0819691.7; bearing a date of Jan. 16, 2009; p. 1.

Eleftheriades, George V., et al.; Planar Negative Refractive Index Media Using Periodically *L-C* Loaded Transmission Lines; IEEE Transactions on Microwave Theory and Techniques; bearing a date of Dec. 12, 2002; pp. 2702-2712; vol. 50, No. 12; © 2002 IEEE.

Freire, M.J., et al.; "Three dimensional sub-diffraction imaging by a planar metamaterial lens"; Microwave Conference, 2005 European; bearing a date of Oct. 4-6, 2005; pp. 1-4; vol. 2; located at http://ieeexplore.ieee.org/search/wrapper.jsp?arnumber=1610024.

Hwang, Jiunn-Nan et al.; "Reduction of the Peak SAR in the Human Head With Metamaterials"; IEEE Transactions on Antennas and Propagation; bearing a date of Dec. 2006; pp. 3763-3770; vol. 54, No. 12; © 2006 IEEE.

Intellectual Property Office Search Report Under Section 17(6); App. No. GB0819691.7; Jun. 22, 2009; pp. 1-2 [1 of 4].

Intellectual Property Office Search Report Under Section 17(6); App. No. GB0819691.7; Jun. 22, 2009; pp. 1-2 [2 of 4].

Intellectual Property Office Search Report Under Section 17(6); App. No. GB0819691.7; Jun. 22, 2009; pp. 1-2 [3 of 4].

Intellectual Property Office Search Report Under Section 17(6); App. No. GB0819691.7; Jun. 22, 2009; pp. 1-2 [4 of 4].

Landy, N.I., et al.; "A Perfect Metamaterial Absorber"; arXiv:0803,1670v1[cond-mat.mes-hall]; bearing a date of Mar. 11, 2008; pp. 1-6; located at http://arxiv.org/PS_cache/arxiv/pdf/0803/0803.1670v1.pdf.

PCT International Search Report; International App. No. PCT/US 09/03292; bearing a date of Aug. 6, 2009; pp. 1-3.

Pendry, J.B.; "Manipulating the Near Field with Metamaterials"; Optics & Photonics News; bearing a date of Sep. 2004; pp. 1-6.

Smith, D. R., et al.; "Gradient index metamaterials"; Physical Review E 71, 036609; bearing a date of 2005; pp. 1-6; © 2005 The American Physical Society.

Urban, Jeffrey J., et al.; "Synergism in binary nanocrystal superlattices leads to enhanced p-type conductivity in self-assembled PbTe/$Ag_2$Te thin films"; Nature Materials; bearing a date of Feb. 2007; pp. 115-121; vol. 6; © 2007 Nature Publishing Group.

Wiltshire, M.C.K., et al.; "Metamaterial endoscope for magnetic field transfer: near field imaging with magnetic wires"; Optics Express; bearing a date of Apr. 7, 2003; pp. 709-715; vol. 11, No. 7; © 2003 OSA.

Xu, Z. X., et al.; "Controllable Absorbing Structure of Metamaterial At Microwave"; Progress in Electromagnetics Research, PIER; bearing a date of 2007; pp. 117-125; vol. 69.

PCT International Search Report; International App. No. PCT/US 09/03272; pp. 1-4; Sep. 21, 2009.

Sears, Francis Weston; "Refraction of a Spherical Wave at a Plane Surface"; "Optics"; bearing a $5^{th}$ printing date of Apr. 1958; pp. 38-43; Addison-Wesley Publishing Company; Reading, MA.

Wang, et al.; "Nanopin Plasmonic Resonator Array and Its Optical Properties"; Nano Letters; bearing a date of 2007; pp. 1076-1080; vol. 7, No. 4; American Chemical Society.

PCT International Search Report; International App. No. PCT/US 09/01108; Nov. 16, 2009; pp. 1-2.

UK Intellectual Property Office Examination Report Under Section 18(3); App. No. GB0819691.7; Jun. 25, 2010 (received by our Agent on Jun. 29, 2010); pp. 1-3.

*Ariad* v. *Eli Lilly*; United States Court of Appeals for the Federal Circuit; Case No. 2008-1248; bearing a date of 2010; total of 72 pages; located at http://www.cafc.uscourts.gov/opinions/08-1248.pdf.

Cowan, Ben; "FDTD modeling of photonic crystal fibers"; EE256 Final Project; received on May 14, 2010; pp. 1-7.

Driscoll, T. et al.; "Free-space microwave focusing by a negative-index gradient lens"; Applied Physics Letters; bearing a published online date of Feb. 21, 2006; printed on May 14, 2010; pp. 1-4; vol. 88, Issue 8; © 2006 American Institute of Physics.

Grzegorczyk, Tomasz M. et al.; "Refraction Laws for Anisotropic Media and Their Application to Left-Handed Metamaterials"; IEEE Transactions on Microwave Theory and Techniques; bearing a date of Apr. 2005; pp. 1443-1450; vol. 53, No. 4; © 2005 IEEE.

Padilla, Willie J. et al.; "Negative refractive index metamaterials"; Materials Today; bearing a date of Jul.-Aug. 2006; pp. 28-35; vol. 9, No. 7-8; © Elsevier Ltd. 2006.

Satoh, Hiroaki et al.; "Studies on Functional Photonic Crystal Devices Utilizing Anisotropic Medium Properties by Condensed Node Spatial Network Method"; International Symposium on Communications and Information Technologies 2004 (ISCIT 2004); bearing a date of Oct. 26-29, 2004; pp. 829-834.

Yannopapas, Vassilios et al.; "Negative refractive index metamaterials from inherently non-magnetic materials for deep infrared to terahertz frequency ranges"; Journal of Physics: Condensed Matter; bearing a date of 2005; pp. 3717-3734; vol. 17; Institute of Physics Publishing.

Padilla, Willie J. et al; "Negative refractive index metamaterials"; materialstoday; Jul.-Aug. 2006; pp. 28-35; vol. 9; No. 7-8; Elsevier Ltd.

* cited by examiner

EMITTING AND FOCUSING APPARATUS, METHODS, AND SYSTEMS

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)).

RELATED APPLICATIONS

For purposes of the USPTO extra-statutory requirements, the present application constitutes a continuation-in-part of U.S. patent application Ser. No. 12/156,443, entitled FOCUSING AND SENSING APPARATUS, METHODS, AND SYSTEMS, naming Jeffrey A. Bowers, Roderick A. Hyde, Edward K. Y. Jung, John Brian Pendry, David Schurig, David R. Smith, Clarence T. Tegreene, Thomas Weaver, Charles Whitmer, and Lowell L. Wood, Jr. as inventors, filed May 30, 2008, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/214,534, entitled EMITTING AND FOCUSING APPARATUS, METHODS, AND SYSTEMS, naming Jeffrey A. Bowers, Roderick A. Hyde, Edward K. Y. Jung, John Brian Pendry, David Schurig, David R. Smith, Clarence T. Tegreene, Thomas A. Weaver, Charles Whitmer, and Lowell L. Wood, Jr. as inventors, filed Jun. 18, 2008, which is currently co-pending, or is an application of which a currently co-pending application is entitled to the benefit of the filing date.

The United States Patent Office (USPTO) has published a notice to the effect that the USPTO's computer programs require that patent applicants reference both a serial number and indicate whether an application is a continuation or continuation-in-part. Stephen G. Kunin, *Benefit of Prior-Filed Application*, USPTO Official Gazette Mar. 18, 2003, available at http://www.uspto.gov/web/offices/com/sol/og/2003/week11/patbene.htm. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant is designating the present application as a continuation-in-part of its parent applications as set forth above, but expressly points out that such designations are not to be construed in any way as any type of commentary and/or admission as to whether or not the present application contains any new matter in addition to the matter of its parent application(s).

All subject matter of the Related Applications and of any and all parent, grandparent, great-grandparent, etc. applications of the Related Applications is incorporated herein by reference to the extent such subject matter is not inconsistent herewith.

TECHNICAL FIELD

The application discloses apparatus, methods, and systems that may relate to electromagnetic responses that include emitting, field-adjusting, and focusing.

DETAILED DESCRIPTION

Figure 1:
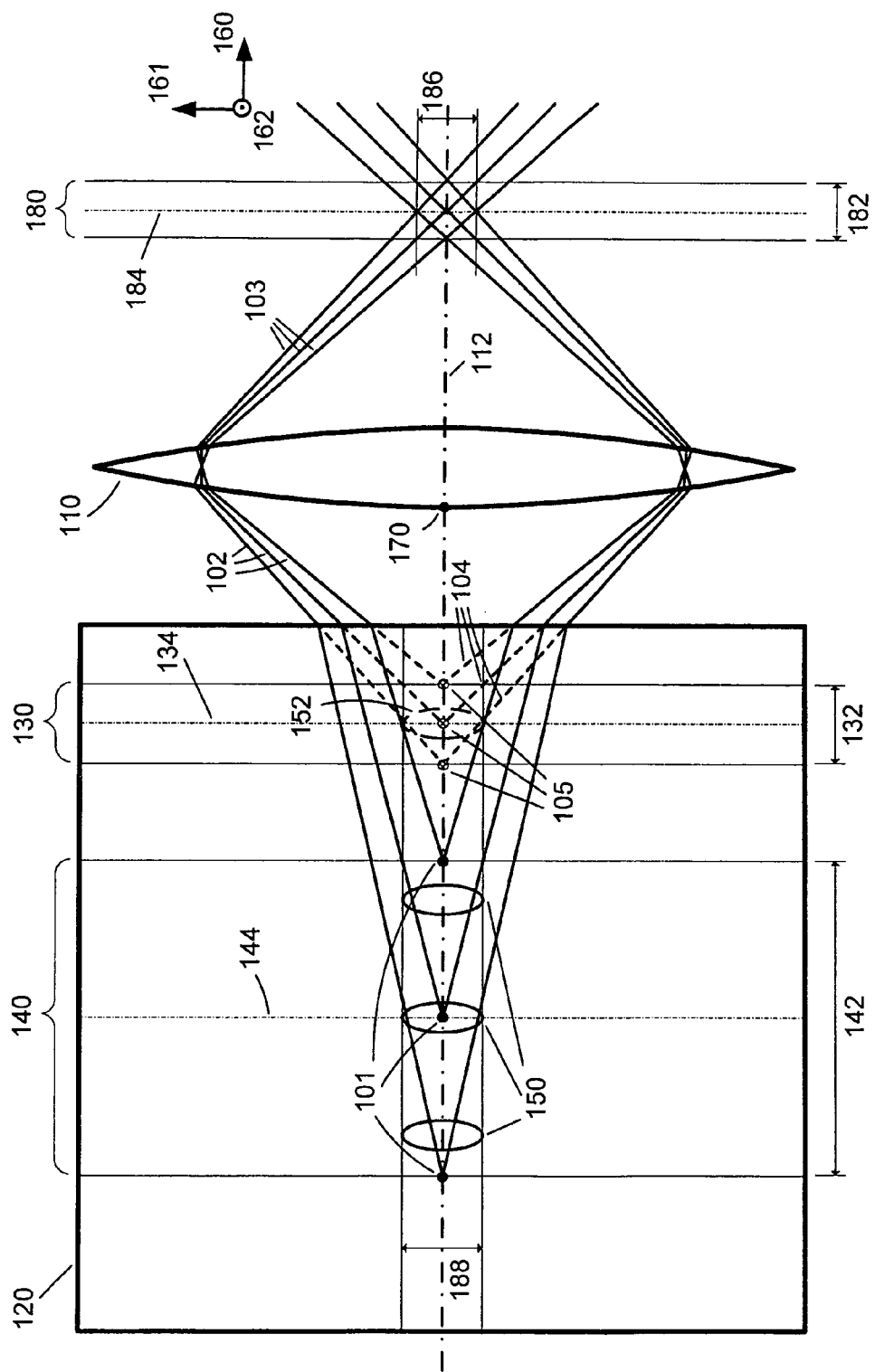
FIG. 1 depicts a first configuration of a focusing structure and a field-adjusting structure.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Transformation optics is an emerging field of electromagnetic engineering. Transformation optics devices include lenses that refract electromagnetic waves, where the refraction imitates the bending of light in a curved coordinate space (a "transformation" of a flat coordinate space), e.g. as described in A. J. Ward and J. B. Pendry, "Refraction and geometry in Maxwell's equations," J. Mod. Optics 43, 773 (1996), J. B. Pendry and S. A. Ramakrishna, "Focusing light using negative refraction," J. Phys. [Cond. Matt.] 15, 6345 (2003), D. Schurig et al, "Calculation of material properties and ray tracing in transformation media," Optics Express 14, 9794 (2006) ("D. Schurig et al (1)"), and in U. Leonhardt and T. G. Philbin, "General relativity in electrical engineering," New J. Phys. 8, 247 (2006), each of which is herein incorporated by reference. The use of the term "optics" does not imply any limitation with regards to wavelength; a transformation optics device may be operable in wavelength bands that range from radio wavelengths to visible wavelengths.

A First Exemplary Transformation Optics Device is the Electromagnetic Cloak that was described, simulated, and implemented, respectively, in J. B. Pendry et al, "Controlling electromagnetic waves," Science 312, 1780 (2006); S. A. Cummer et al, "Full-wave simulations of electromagnetic cloaking structures," Phys. Rev. E 74, 036621 (2006); and D. Schurig et al, "Metamaterial electromagnetic cloak at microwave frequencies," Science 314, 977 (2006) ("D. Schurig et al (2)"); each of which is herein incorporated by reference. See also J. Pendry et al, "Electromagnetic cloaking method," U.S. patent application Ser. No. 11/459,728, herein incorporated by reference. For the electromagnetic cloak, the curved coordinate space is a transformation of a flat space that has been punctured and stretched to create a hole (the cloaked region), and this transformation corresponds to a set of constitutive parameters (electric permittivity and magnetic permeability) for a transformation medium wherein electromagnetic waves are refracted around the hole in imitation of the curved coordinate space.

A second exemplary transformation optics device is illustrated by embodiments of the electromagnetic compression structure described in J. B. Pendry, and D. R. Smith, "Electromagnetic compression apparatus, methods, and systems," U.S. patent application Ser. No. 11/982,353; and in J. B. Pendry, D. Schurig, and D. R. Smith, "Electromagnetic compression apparatus, methods, and systems," U.S. patent application Ser. No. 12/069,170; each of which is herein incorporated by reference. In embodiments described therein, an electromagnetic compression structure includes a transformation medium with constitutive parameters corresponding to a coordinate transformation that compresses a region of space intermediate first and second spatial locations, the effective spatial compression being applied along an axis joining the first and second spatial locations. The electromagnetic compression structure thereby provides an effective electromagnetic distance between the first and second spatial locations greater than a physical distance between the first and second spatial locations.

A third exemplary transform optics device is illustrated by embodiments of the electromagnetic cloaking and/or translation structure described in J. T. Kare, "Electromagnetic cloaking apparatus, methods, and systems," U.S. patent application Ser. No. 12/074,247; and in J. T. Kare, "Electromagnetic cloaking apparatus, methods, and systems," U.S. patent application Ser. No. 12/074,248; each of which is herein incorporated by reference. In embodiments described therein, an electromagnetic translation structure includes a transformation medium that provides an apparent location of an electromagnetic transducer different then an actual location of the electromagnetic transducer, where the transformation medium has constitutive parameters corresponding to a coordinate transformation that maps the actual location to the apparent location. Alternatively or additionally, embodiments include an electromagnetic cloaking structure operable to divert electromagnetic radiation around an obstruction in a field of regard of the transducer (and the obstruction can be another transducer).

Additional exemplary transformation optics devices are described in D. Schurig et al, "Transformation-designed optical elements," Opt. Exp. 15, 14772 (2007); M. Rahm et al, "Optical design of reflectionless complex media by finite embedded coordinate transformations," Phys. Rev. Lett. 100, 063903 (2008); and A. Kildishev and V. Shalaev, "Engineering space for light via transformation optics," Opt. Lett. 33, 43 (2008); each of which is herein incorporated by reference.

In general, for a selected coordinate transformation, a transformation medium can be identified wherein electromagnetic waves refract as if propagating in a curved coordinate space corresponding to the selected coordinate transformation. Constitutive parameters of the transformation medium can be obtained from the equations:

$$\tilde{\in}^{i'j'} = |det(\Lambda)|^{-1} \Lambda_i^{i'} \Lambda_j^{j'} \in^{ij} \quad (1)$$

$$\tilde{\in}^{i'j'} = |det(\Lambda)|^{-1} \Lambda_i^{i'} \Lambda_j^{j'} \mu^{ij} \quad (2)$$

where $\tilde{\in}$ and $\tilde{\mu}$ are the permittivity and permeability tensors of the transformation medium, $\in$ and $\mu$ are the permittivity and permeability tensors of the original medium in the untransformed coordinate space, and $$\Lambda_i^{i'} = \frac{\partial x^{i'}}{\partial x^i} \quad (3)$$

is the Jacobian matrix corresponding to the coordinate transformation. In some applications, the coordinate transformation is a one-to-one mapping of locations in the untransformed coordinate space to locations in the transformed coordinate space, and in other applications the coordinate transformation is a many-to-one mapping of locations in the untransformed coordinate space to locations in the transformed coordinate space. Some coordinate transformations, such as many-to-one mappings, may correspond to a transformation medium having a negative index of refraction. In some applications, only selected matrix elements of the permittivity and permeability tensors need satisfy equations (1) and (2), e.g. where the transformation optics response is for a selected polarization only. In other applications, a first set of permittivity and permeability matrix elements satisfy equations (1) and (2) with a first Jacobian $\Lambda$, corresponding to a first transformation optics response for a first polarization of electromagnetic waves, and a second set of permittivity and permeability matrix elements, orthogonal (or otherwise complementary) to the first set of matrix elements, satisfy equations (1) and (2) with a second Jacobian $\Lambda'$, corresponding to a second transformation optics response for a second polarization of electromagnetic waves. In yet other applications, reduced parameters are used that may not satisfy equations (1) and (2), but preserve products of selected elements in (1) and selected elements in (2), thus preserving dispersion relations inside the transformation medium (see, for example, D. Schurig et al (2), supra, and W. Cai et al, "Optical cloaking with metamaterials," Nature Photonics 1, 224 (2007), herein incorporated by reference). Reduced parameters can be used, for example, to substitute a magnetic response for an electric response, or vice versa. While reduced parameters preserve dispersion relations inside the transformation medium (so that the ray or wave trajectories inside the transformation medium are unchanged from those of equations (1) and (2)), they may not preserve impedance characteristics of the transformation medium, so that rays or waves incident upon a boundary or interface of the transformation medium may sustain reflections (whereas in general a transformation medium according to equations (1) and (2) is substantially nonreflective). The reflective or scattering characteristics of a transformation medium with reduced parameters can be substantially reduced or eliminated by a suitable choice of coordinate transformation, e.g. by selecting a coordinate transformation for which the corresponding Jacobian $\Lambda$ (or a subset of elements thereof) is continuous or substantially continuous at a boundary or interface of the transformation medium (see, for example, W. Cai et al, "Nonmagnetic cloak with minimized scattering," Appl. Phys. Lett. 91, 111105 (2007), herein incorporated by reference).

In general, constitutive parameters (such as permittivity and permeability) of a medium responsive to an electromagnetic wave can vary with respect to a frequency of the electromagnetic wave (or equivalently, with respect to a wavelength of the electromagnetic wave in vacuum or in a reference medium). Thus, a medium can have constitutive parameters $\in_1$, $\mu_1$, etc. at a first frequency, and constitutive parameters $\in_2$, $\mu_2$, etc. at a second frequency; and so on for a plurality of constitutive parameters at a plurality of frequencies. In the context of a transformation medium, constitutive parameters at a first frequency can provide a first response to electromagnetic waves at the first frequency, corresponding to a first selected coordinate transformation, and constitutive parameters at a second frequency can provide a second response to electromagnetic waves at the second frequency, corresponding to a second selected coordinate transformation; and so on: a plurality of constitutive parameters at a plurality of frequencies can provide a plurality of responses to electromagnetic waves corresponding to a plurality of coordinate transformations. In some embodiments the first response at the first frequency is substantially nonzero (i.e. one or both of $\in_1$, and $\mu_1$ is substantially non-unity), corresponding to a nontrivial coordinate transformation, and a second response at a second frequency is substantially zero (i.e. $\in_2$ and $\mu_2$ are substantially unity), corresponding to a trivial coordinate transformation (i.e. a coordinate transformation that leaves the coordinates unchanged); thus, electromagnetic waves at the first frequency are refracted (substantially according to the nontrivial coordinate transformation), and electromagnetic waves at the second frequency are substantially nonrefracted. Constitutive parameters of a medium can also change with time (e.g. in response to an external input or control signal), so that the response to an electromagnetic wave can vary with respect to frequency and/or time. Some embodiments may exploit this variation with frequency and/or time to provide respective frequency and/or time multiplexing/demultiplexing of electromagnetic waves. Thus, for example, a transformation medium can have a first response at a frequency at time $t_1$, corresponding to a first selected coordinate transformation, and a second response at the same frequency at time $t_2$, corresponding to a second selected coordinate transformation. As another example, a transformation medium can have a response at a first frequency at time $t_1$, corresponding to a selected coordinate transformation, and substantially the same response at a second frequency at time $t_2$. In yet another example, a transformation medium can have, at time $t_1$, a first response at a first frequency and a second response at a second frequency, whereas at time $t_2$, the responses are switched, i.e. the second response (or a substantial equivalent thereof) is at the first frequency and the first response (or a substantial equivalent thereof) is at the second frequency. The second response can be a zero or substantially zero response. Other embodiments that utilize frequency and/or time dependence of the transformation medium will be apparent to one of skill in the art.

Constitutive parameters such as those of equations (1) and (2) (or reduced parameters derived therefrom) can be realized using artificially-structured materials. Generally speaking, the electromagnetic properties of artificially-structured materials derive from their structural configurations, rather than or in addition to their material composition.

In some embodiments, the artificially-structured materials are photonic crystals. Some exemplary photonic crystals are described in J. D. Joannopoulos et al, *Photonic Crystals: Molding the Flow of Light*, $2^{nd}$ Edition, Princeton Univ. Press, 2008, herein incorporated by reference. In a photonic crystals, photonic dispersion relations and/or photonic band gaps are engineered by imposing a spatially-varying pattern on an electromagnetic material (e.g. a conducting, magnetic, or dielectric material) or a combination of electromagnetic materials. The photonic dispersion relations translate to effective constitutive parameters (e.g. permittivity, permeability, index of refraction) for the photonic crystal. The spatially-varying pattern is typically periodic, quasi-periodic, or colloidal periodic, with a length scale comparable to an operating wavelength of the photonic crystal.

In other embodiments, the artificially-structured materials are metamaterials. Some exemplary metamaterials are described in R. A. Hyde et al, "Variable metamaterial apparatus," U.S. patent application Ser. No. 11/355,493; D. Smith et al, "Metamaterials," International Application No. PCT/US2005/026052; D. Smith et al, "Metamaterials and negative refractive index," Science 305, 788 (2004); D. Smith et al, "Indefinite materials," U.S. patent application Ser. No. 10/525,191; C. Caloz and T. Itoh, *Electromagnetic Metamaterials: Transmission Line Theory and Microwave Applications*, Wiley-Interscience, 2006; N. Engheta and R. W. Ziolkowski, eds., *Metamaterials: Physics and Engineering Explorations*, Wiley-Interscience, 2006; and A. K. Sarychev and V. M. Shalaev, *Electrodynamics of Metamaterials, World Scientific*, 2007; each of which is herein incorporated by reference.

Metamaterials generally feature subwavelength elements, i.e. structural elements with portions having electromagnetic length scales smaller than an operating wavelength of the metamaterial, and the subwavelength elements have a collective response to electromagnetic radiation that corresponds to an effective continuous medium response, characterized by an effective permittivity, an effective permeability, an effective magnetoelectric coefficient, or any combination thereof. For example, the electromagnetic radiation may induce charges and/or currents in the subwavelength elements, whereby the subwavelength elements acquire nonzero electric and/or magnetic dipole moments. Where the electric component of the electromagnetic radiation induces electric dipole moments, the metamaterial has an effective permittivity; where the magnetic component of the electromagnetic radiation induces magnetic dipole moments, the metamaterial has an effective permeability; and where the electric (magnetic) component induces magnetic (electric) dipole moments (as in a chiral metamaterial), the metamaterial has an effective magnetoelectric coefficient. Some metamaterials provide an artificial magnetic response; for example, split-ring resonators (SRRs)—or other LC or plasmonic resonators—built from nonmagnetic conductors can exhibit an effective magnetic permeability (c.f. J. B. Pendry et al, "Magnetism from conductors and enhanced nonlinear phenomena," IEEE Trans. Micro. Theo. Tech. 47, 2075 (1999), herein incorporated by reference). Some metamaterials have "hybrid" electromagnetic properties that emerge partially from structural characteristics of the metamaterial, and partially from intrinsic properties of the constituent materials. For example, G. Dewar, "A thin wire array and magnetic host structure with n<0," J. Appl. Phys. 97, 10Q101(2005), herein incorporated by reference, describes a metamaterial consisting of a wire array (exhibiting a negative permeability as a consequence of its structure) embedded in a nonconducting ferrimagnetic host medium (exhibiting an intrinsic negative permeability). Metamaterials can be designed and fabricated to exhibit selected permittivities, permeabilities, and/or magnetoelectric coefficients that depend upon material properties of the constituent materials as well as shapes, chiralities, configurations, positions, orientations, and couplings between the subwavelength elements. The selected permittivites, permeabilities, and/or magnetoelectric coefficients can be positive or negative, complex (having loss or gain), anisotropic, variable in space (as in a gradient index lens), variable in time (e.g. in response to an external or feedback signal), variable in frequency (e.g. in the vicinity of a resonant frequency of the metamaterial), or any combination thereof. The selected electromagnetic properties can be provided at wavelengths that range from radio wavelengths to infrared/visible wavelengths; the latter wavelengths are attainable, e.g., with nanostructured materials such as nanorod pairs or nano-fishnet structures (c.f. S. Linden et al, "Photonic metamaterials: Magnetism at optical frequencies," IEEE J. Select. Top. Quant. Elect. 12, 1097 (2006) and V. Shalaev, "Optical negative-index metamaterials," Nature Photonics 1, 41 (2007), both herein incorporated by reference). An example of a three-dimensional metamaterial at optical frequencies, an elongated-split-ring "woodpile" structure, is described in M. S. Rill et al, "Photonic metamaterials by direct laser writing and silver chemical vapour deposition," Nature Materials advance online publication, May 11, 2008, (doi:10.1038/nmat2197).

While many exemplary metamaterials are described as including discrete elements, some implementations of metamaterials may include non-discrete elements or structures. For example, a metamaterial may include elements comprised of sub-elements, where the sub-elements are discrete structures (such as split-ring resonators, etc.), or the metamaterial may include elements that are inclusions, exclusions, layers, or other variations along some continuous structure (e.g. etchings on a substrate). Some examples of layered metamaterials include: a structure consisting of alternating doped/intrinsic semiconductor layers (cf. A. J. Hoffman, "Negative refraction in semiconductor metamaterials," Nature Materials 6, 946 (2007), herein incorporated by reference), and a structure consisting of alternating metal/dielectric layers (cf. A. Salandrino and N. Engheta, "Far-field subdiffraction optical microscopy using metamaterial crystals: Theory and simulations," Phys. Rev. B 74, 075103 (2006); and Z. Jacob et al, "Optical hyperlens: Far-field imaging beyond the diffraction limit," Opt. Exp. 14, 8247 (2006); each of which is herein incorporated by reference). The metamaterial may include extended structures having distributed electromagnetic responses (such as distributed inductive responses, distributed capacitive responses, and distributed inductive-capacitive responses). Examples include structures consisting of loaded and/or interconnected transmission lines (such as microstrips and striplines), artificial ground plane structures (such as artificial perfect magnetic conductor (PMC) surfaces and electromagnetic band gap (EGB) surfaces), and interconnected/extended nanostructures (nano-fishnets, elongated SRR woodpiles, etc.).

With reference now to FIG. 1, an illustrative embodiment is depicted that includes a focusing structure 110 and a field-adjusting structure 120. This and other drawings, unless context dictates otherwise, can represent a planar view of a three-dimensional embodiment, or a two-dimensional embodiment (e.g. in FIG. 1 where the structures are positioned inside a metallic or dielectric slab waveguide oriented normal to the page). The focusing structure receives input electromagnetic energy, depicted as solid rays 102, and transmits output electromagnetic energy, depicted as solid rays 103 (the use of a ray description, in FIG. 1 and elsewhere, is a heuristic convenience for purposes of visual illustration, and is not intended to connote any limitations or assumptions of geometrical optics; further, the elements depicted in FIG. 1 can have spatial dimensions that are variously less than, greater than, or comparable to a wavelength of interest). The output electromagnetic energy converges towards a nominal focusing region 180; in this example, the nominal focusing region 180 is depicted as a slab having a thickness equal to a nominal depth of focus 182 and centered on a nominal image plane 184. In FIG. 1, the input electromagnetic energy radiates from electromagnetic sources 101 (positioned on an optical axis 112 of the focusing structure); the field-adjusting structure 120 influences the propagation of the input electromagnetic energy (e.g. by refracting the rays 102, as depicted) and transmits the input electromagnetic energy to the focusing structure 110. The dashed rays 104 represent the "nominal" propagation of the input electromagnetic energy, i.e. the trajectory of the input electromagnetic energy—prior to its receiving at the focusing structure—that would occur in the absence of the field-adjusting structure. As the dashed rays indicate, the input electromagnetic energy apparently radiates, prior to its receiving at the focusing structure, from apparent electromagnetic source locations 105 different than the actual electromagnetic source locations 101. The apparent electromagnetic source locations 105 are positioned with a nominal field region 130 of the focusing structure, the nominal field region having a nominal depth of field 132; in this example, the nominal field region 130 is depicted as a slab having a thickness equal to the nominal depth of field 132 and centered on a nominal object plane 134. The field-adjusting structure 120 influences the propagation of the input electromagnetic energy to provide an actual field region 140 different than the nominal field region 130, the actual field region having an actual depth of field 142 which is an extended depth of field greater than the nominal depth of field; in this example, the actual field region 140 is depicted as a slab having a thickness equal to the actual depth of field 142 and centered on an actual object plane 144. Embodiments optionally include one or more electromagnetic emitters (schematically depicted as ellipses 150) positioned within the actual field region. The dashed ellipse 152 represents a nominal emitter positioning, i.e. an emitter positioning within the nominal field region 130 that could apply in the absence of the field-adjusting structure (in the present example, emitters are positioned only along the optical axis 112 of the focusing structure, but this is not intended to be limiting). As the figure demonstrates, the actual depth of field may, in some embodiments, accommodate more emitters than the nominal depth of field.

The focusing structure 110 is depicted in FIG. 1 as having a lens-like shape, but this is a schematic illustration and is not intended to be limiting. In various embodiments, focusing structures can include reflective structures (e.g. parabolic dish reflectors), refractive structures (e.g. dielectric, microwave, gradient index, or metamaterial lenses), diffractive structures (e.g. Fresnel zone plates), antenna structures (e.g. antenna director elements, antenna arrays), waveguiding structures (e.g. waveguides, transmission lines, and coherent bundles thereof) and various combinations, assemblies, portions, and hybrids thereof (such as an optical assembly or a refractive-diffractive lens). In general, a focusing structure provides a nominal field region and a nominal focusing region; in the absence of a field-adjusting structure, electromagnetic energy that radiates from the nominal field region, and couples to the focusing structure, is subsequently substantially concentrated in the nominal focusing region. For example, in some applications the nominal field region is the set of object points having nominal point spread functions—defined on a selected image surface—for which the diameters/diagonals of the nominal point spread functions are less than a selected maximum diameter/diagonal (e.g. a circle of confusion diameter limit), the diameters/diagonals corresponding to a selected encircled/ensquared energy (e.g. 50%, 75%, or 90% encircled/ensquared energy). In some embodiments, the nominal field region may be a planar or substantially planar slab (e.g. 130 in FIG. 1) having a thickness corresponding to a nominal depth of field of the focusing structure (e.g. 132 in FIG. 1) and centered on a nominal object plane (e.g. 134 in FIG. 1). In other embodiments, the nominal field region may be a non-planar region, e.g. a cylindrically-, spherically-, ellipsoidally-, or otherwise-curved slab having a thickness corresponding to a nominal depth of field of the focusing structure, and the non-planar region may enclose a non-planar object surface (such as a Petzval, sagittal, or transverse object surface). Those of skill in the art will understand that the terms "object plane" (or "object surface") and "focal plane" (or "focal surface") may be used interchangeably depending upon the context; for example, in various contexts a focal surface may be an infinite conjugate focal surface (e.g. an image surface for an object at infinite distance or an object surface for an image at infinite distance), a first focal surface may be a finite conjugate of a second focal surface (e.g. where the first focal surface is a finite-distance image surface and the second focal plane is a corresponding finite-distance object surface), etc. Similarly, the terms "image plane" (or "image surface") and "focal plane" (or "focal surface") may be used interchangeably depending upon the context. In some embodiments the focusing structure defines an optical axis (such as that depicted as element 112 in FIG. 1) as a symmetry or central axis of the focusing structure, and the optical axis provides an axial direction (such as the axial unit vector 160 in FIG. 1), with transverse directions defined perpendicular thereto (such as the transverse unit vectors 161 and 162 in FIG. 1). More generally, one may define an axial direction corresponding to the nominal depth of field (with transverse directions perpendicular thereto), so that the nominal depth of field is equivalent to a nominal axial dimension of the nominal field region. This is consistent with FIG. 1, where the nominal field region is a planar slab, and the axial direction corresponds to a unit vector normal to the slab. Where the nominal field region is curved, the axial direction can vary along the transverse extent of the field region. For example, where the nominal field region is a cylindrically- or spherically-curved slab, the axial direction corresponds to a radius unit vector (and the transverse directions correspond to height/azimuth unit vectors or azimuth/zenith unit vectors, respectively); where the nominal field region is an otherwise-curved slab, the axial direction corresponds to a vector locally normal to the slab surface (and the transverse directions correspond to orthogonal unit vectors locally tangent to the slab surface).

In some embodiments the nominal depth of field of a focusing structure may be related to an f-number f/# of the focusing structure, and/or to an object resolution length $l_o$ in a transverse direction of the nominal field region (moreover, the object relation length $l_o$ may relate to an image resolution length $l_i$ in a transverse direction of the nominal focusing region according to the relation $l_i=ml_o$, for a focusing structure that provides a transverse magnification m). The f-number can correspond to a ratio of focal length to aperture diameter for the focusing structure, and may (inversely) characterize the divergence of electromagnetic energy away from the nominal field region; moreover, the divergence can correspond to a ratio of nominal depth of field to transverse object resolution length; so the following general relation may apply for the focusing structure:

$$f/\# \sim \frac{DOF_N}{l_o} = \frac{DOF_N}{ml_i} \quad (4)$$

where $DOF_N$ is the nominal depth of field. Thus, for a fixed f-number, a larger (smaller) nominal depth of field corresponds to a larger (smaller) resolution length. This is demonstrated, for example, in FIG. 1, which indicates an object resolution length 188 corresponding to a transverse extent of the central nominal rays 104 at the surface of the nominal field region 130 (the figure also indicates an image resolution length 186). In some embodiments the f-number is a working f-number corresponding to a ratio of object distance to aperture diameter for the focusing structure (where the object distance is a distance from the object plane 134 to the front vertex 170 of the focusing structure); the working f-number may inversely correspond to a numerical aperture N.A. of the focusing structure according to the relation $f/\# \cong 1/(2 \times N.A.)$. In some embodiments the image resolution length may correspond to a circle of confusion (CoC) diameter limit for image blur perception, and/or the object resolution length may correspond to a transverse extent of (the emissive aperture of) an individual emitter or multiplet of emitters, as further discussed below.

In the context of a field-adjusting structure (e.g. 120 in FIG. 1), one may further define (in addition to a nominal field region discussed above) an actual field region different than the nominal field region; electromagnetic energy that radiates from the actual field region, and couples to the field-adjusting structure, consequently apparently radiates from the nominal field region; when the electromagnetic energy then couples to the focusing structure, the electromagnetic energy is subsequently substantially concentrated in the nominal focusing region. For example, in some applications the actual field region is the set of object points having actual point spread functions (different than the nominal point spread functions)—defined on a selected image surface—for which the diameters/diagonals of the actual point spread functions are less than a selected maximum diameter/diagonal (e.g. a circle of confusion diameter limit), the diameters/diagonals corresponding to a selected encircled/ensquared energy (e.g. 50%, 75%, or 90% encircled/ensquared energy). In some embodiments, the actual field region may be a planar or substantially planar slab (e.g. 140 in FIG. 1) having a thickness corresponding to an actual depth of field of the focusing structure (e.g. 142 in FIG. 1) and centered on an actual object plane (e.g. 144 in FIG. 1). In other embodiments, the actual field region may be a non-planar region, e.g. a cylindrically-, spherically-, ellipsoidally-, or otherwise-curved slab having a thickness corresponding to an actual depth of field of the focusing structure, and the non-planar region may enclose a non-planar object surface (such as a Petzval, sagittal, or transverse object surface). In embodiments where the nominal field region and the actual field region are substantially parallel (for substantially planar slabs), substantially concentric/confocal (for substantially cylindrically-, spherically, or ellipsoidally-curved slabs), or otherwise substantially co-curved, the axial and transverse directions (defined previously for the nominal field region) also apply to the geometry of the actual field region; i.e. the axial direction corresponds to both the nominal and axial depths of field (with transverse directions perpendicular thereto), and the actual depth of field is equivalent to a actual axial dimension of the actual field region as measured along the axial dimension defined previously.

Figure 2:
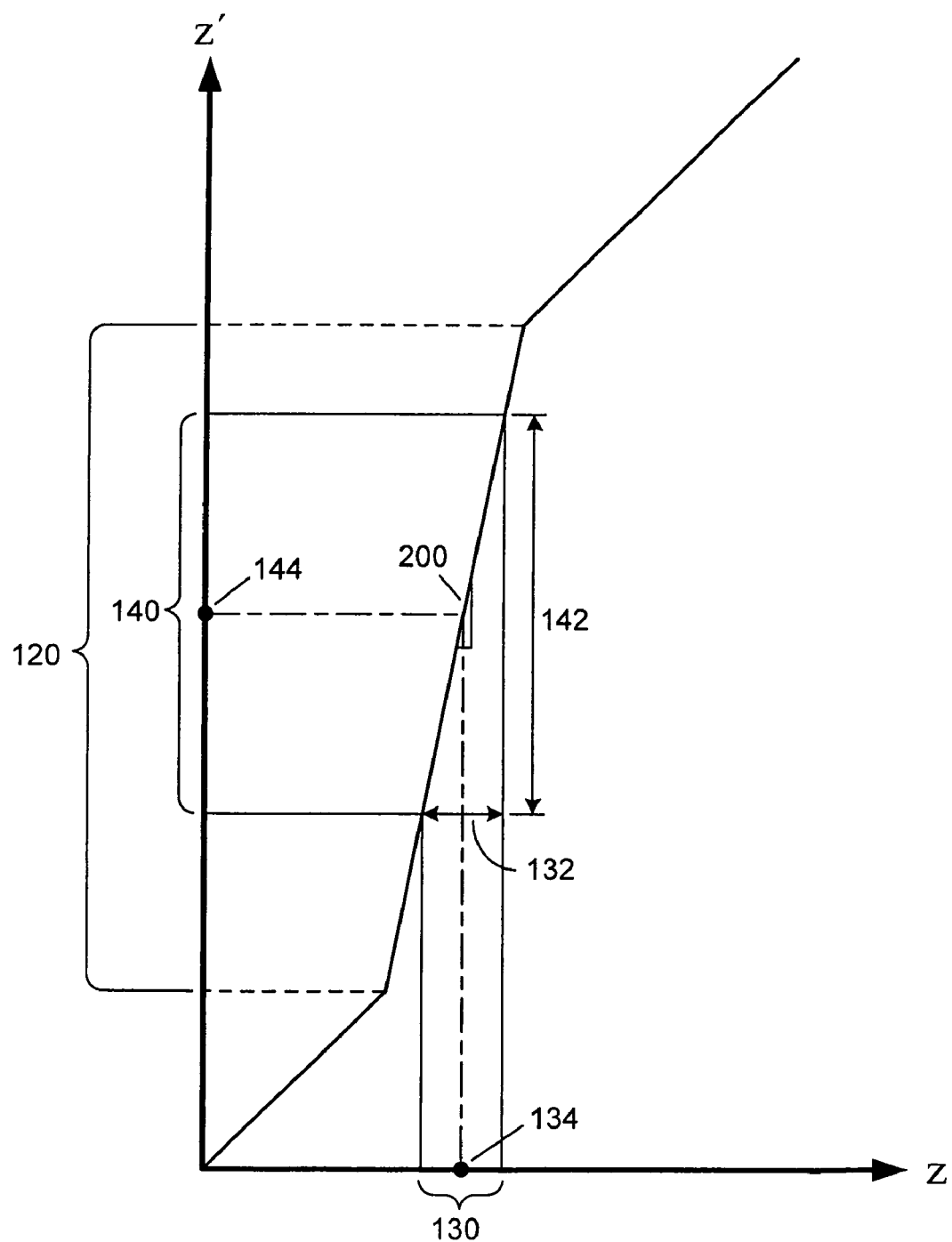
FIG. 2 depicts a first coordinate transformation.

In some embodiments a field-adjusting structure, such as that depicted in FIG. 1, includes a transformation medium. For example, the ray trajectories 102 in FIG. 1 correspond to a coordinate transformation that is a uniform spatial dilation along the axial direction 160 (within the axial extent of the field-adjusting structure 120); this coordinate transformation can be used to identify constitutive parameters for a corresponding transformation medium (e.g. as provided in equations (1) and (2), or reduced parameters obtained therefrom) that responds to electromagnetic radiation as in FIG. 1. Explicitly, for the example of FIG. 1, defining z as an untransformed (nominal) axial coordinate and z' as a transformed (actual) axial coordinate (where the axial coordinates are measured along the optical axis 112), the coordinate transformation z'=f(z) is depicted in FIG. 2. The nominal field region 130 and the z-position of the nominal object plane 134 are indicated on the z-axis; the actual field region 140, the z'-position of the actual object plane 144, and the axial extent of the field-adjusting structure 120 are indicated on the z'-axis. Defining a scale factor $$s = \frac{dz'}{dz} = f'(z), \quad (5)$$

the example of FIGS. 1-2 presents a constant scale factor s>1 within the field-adjusting structure 120, corresponding to a uniform spatial dilation. Supposing that the field-adjusting structure is surrounded by an ambient isotropic medium with constitutive parameters $\in^{ij}=\in\delta^{ij}$, $\mu^{ij}=\mu\delta^{ij}$, the constitutive parameters of the transformation medium are obtained from equations (1) and (2) and are given by (in a basis with unit vectors 161, 162, and 160, respectively, in FIG. 1)

$$\tilde{\varepsilon} = \begin{pmatrix} s^{-1} & 0 & 0 \\ 0 & s^{-1} & 0 \\ 0 & 0 & s \end{pmatrix} \varepsilon, \quad \tilde{\mu} = \begin{pmatrix} s^{-1} & 0 & 0 \\ 0 & s^{-1} & 0 \\ 0 & 0 & s \end{pmatrix} \mu. \quad (6)$$

Thus, the uniform spatial dilation of FIGS. 1-2 corresponds to a transformation medium that is a uniform uniaxial medium.

Figure 3:
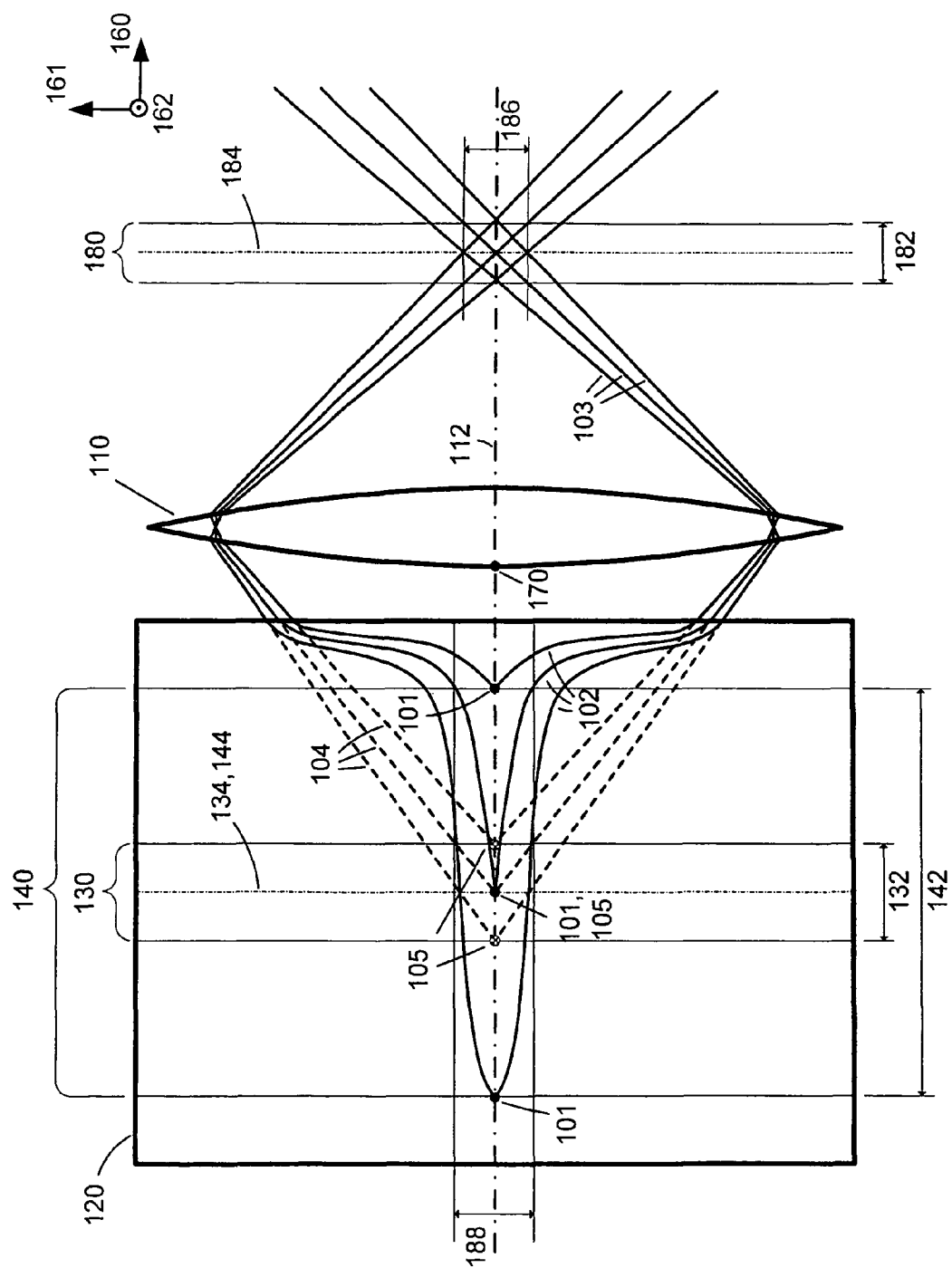
FIG. 3 depicts a second configuration of a focusing structure and a field-adjusting structure.
Figure 4:
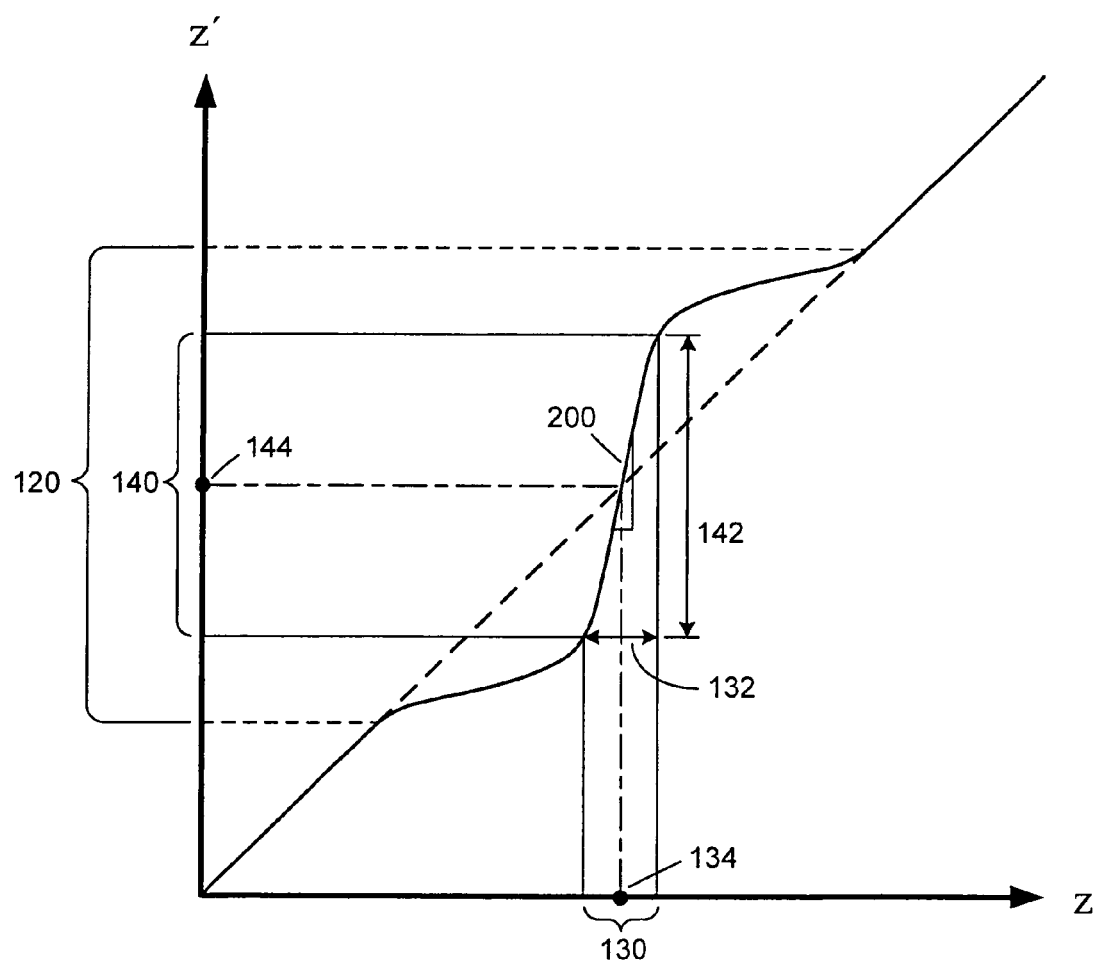
FIG. 4 depicts a second coordinate transformation.

In some embodiments, the field-adjusting structure includes a transformation medium that provides a non-uniform spatial dilation. An example is depicted in FIG. 3 and the corresponding coordinate transformation z'=f(z) is depicted in FIG. 4. In FIG. 3, as in FIG. 1, a focusing structure 110 provides a nominal field region 130 having a nominal depth of field 132, and the field-adjusting structure 120 provides an actual field region 140 having an actual depth of field 142, where the actual depth of field is an extended depth of field greater than the nominal depth of field. In contrast to FIG. 1, however, the embodiment of FIG. 3 provides an actual object plane 144 coincident with the nominal object plane 134; moreover, an optical path length through the field-adjusting structure is equal to a nominal optical path length where the field-adjusting structure is replaced by an ambient medium. These attributes are demonstrated in FIG. 4, where the dashed line z'=z intersects z'=f(z) at the position of the object plane, and at the endpoints of the field-adjusting structure. The example of FIGS. 3-4 presents a non-uniform scale factor s (the slope of the mapping function z'=f(z)); indeed, the scale factor in this example is variously less than unity (corresponding to a local spatial compression) and greater than unity (corresponding to a local spatial dilation). The constitutive relations are again given by equations (6), where s is variable in the axial direction, and the transformation medium is a non-uniform uniaxial medium.

More generally, embodiments of a field-adjusting structure, operable to provide an extended depth of field for input electromagnetic energy greater than the nominal depth of field, may comprise a transformation medium, the transformation medium corresponding to a coordinate transformation that maps a nominal field region (with a nominal depth of field) to an actual field region (with an actual depth of field greater than the nominal depth of field); and the constitutive relations of this transformation medium may be implemented with an artificially-structured material (such as a metamaterial), as described previously. In some embodiments, the coordinate transformation from the nominal field region to the actual field region includes a spatial dilation along an axial direction of the nominal field region, and a scale factor of the spatial dilation (within the actual field region) may correspond to a ratio of the actual depth of field to the nominal depth of field. This is consistent with FIGS. 2 and 4, where the slope triangle 200, indicating the scale factor on the object plane, is similar or substantially similar to a triangle with a base 132 and a height 142. Just as the axial direction can vary along a transverse extent of the nominal field region, the direction of the spatial dilation can vary as well. Thus, for example, a substantially cylindrically- or spherically-curved actual field region may be a (uniform or non-uniform) radial dilation of a substantially cylindrically- or spherically-curved nominal field region; a substantially ellipsoidally-curved actual field region may be a (uniform or non-uniform) confocal dilation of a substantially ellipsoidally-curved nominal field region; etc.

In some embodiments, where the focusing structure defines an f-number f/# as discussed previously, the influence of the field-adjusting structure provides a modified relationship (as compared to equation (4)) between the f-number, the depth of field, and the object/image resolution lengths $l_o$, $l_i$. Namely, some embodiments provide the relation $$f/\# \sim \frac{1}{s}\frac{DOF_A}{l_o} = \frac{1}{s}\frac{DOF_A}{ml_i}, \quad (7)$$

where $DOF_A$, is the actual depth of field and s is a scale factor for a spatial dilation applied along the axial direction. The f-number is here defined independently of the field-adjusting structure: it is a ratio of the nominal focal distance (or nominal object distance, where the f-number is a working f-number) to aperture diameter for the focusing structure (however, some embodiments provide an actual focal/object distance and a nominal focal/object distance that are substantially unequal, but that correspond to substantially equal optical path lengths). Combining equations (4) and (7) recovers the relation $DOF_A \sim s \times DOF_N$ discussed in the preceding paragraph.

Figure 5:
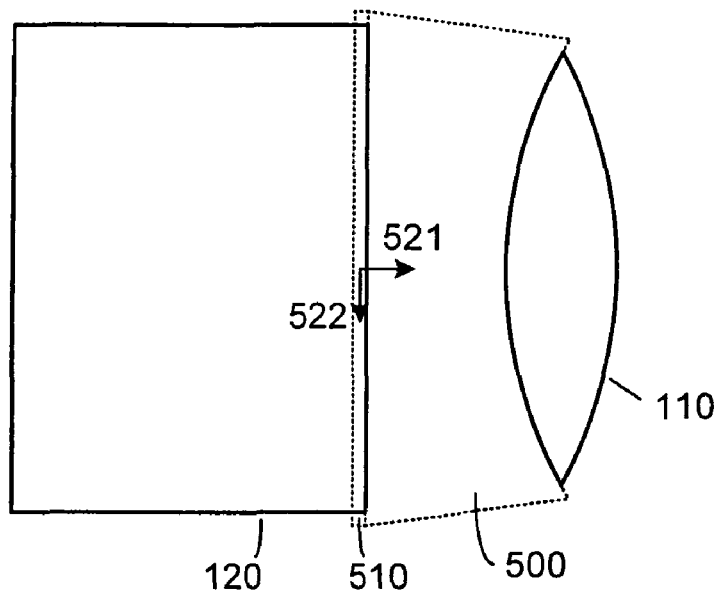
FIG. 5 depicts a focusing structure and a field-adjusting structure with a spatial separation.
Figure 6:
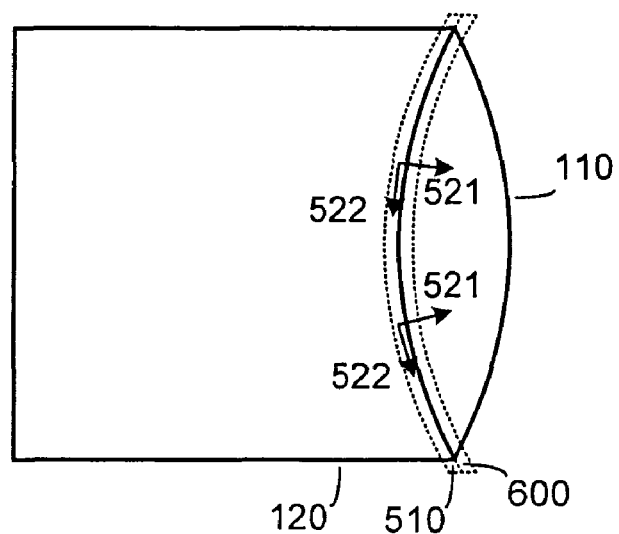
FIG. 6 depicts a focusing structure and a field-adjusting structure without a spatial separation.

The field-adjusting structure 120 is depicted in FIGS. 1 and 3 as a planar slab, but this is a schematic illustration and is not intended to be limiting. In various embodiments the field-adjusting structure can be a cylindrically-, spherically-, or ellipsoidally-curved slab, or any other slab- or non-slab-like structure configured to transmit the input electromagnetic energy to the focusing structure and provide an extended depth of field greater than the nominal depth of field of the focusing structure. In some embodiments, such as that depicted in FIG. 5, the field-adjusting structure 120 and the focusing structure 110 may have a spatial separation, defining an intermediate region 500 between the structures; in other embodiments, such as that depicted in FIG. 6, the field-adjusting structure 120 and the focusing structure 110 may define a composite or contiguous unit. Embodiments may define an output surface region (e.g. region 510 in FIGS. 5 and 6) as a surface region of the field-adjusting structure that transmits input electromagnetic radiation to the focusing structure, and this output surface region may be substantially nonreflective of the input electromagnetic radiation. For example, where the field-adjusting structure is a transformation medium, equations (1) and (2) generally provide a medium that is substantially nonreflective. More generally, the output surface region may be substantially nonreflective by virtue of a substantial impedance-matching to the adjacent medium. When the focusing structure and a field-adjusting structure are spatially separated, the adjacent medium corresponds to the intermediate region (e.g. 500 in FIG. 5). When the focusing structure and a field-adjusting structure are adjacent, the adjacent medium corresponds to an input surface region 600 (e.g. as depicted in FIG. 6) of the focusing structure.

With impedance-matching, a wave impedance of the output surface region is substantially equal to a wave impedance of the adjacent medium. The wave impedance of an isotropic medium is $$Z_0 = \sqrt{\frac{\mu}{\varepsilon}} \qquad (8)$$

while the wave impedance of a generally anisotropic medium is a tensor quantity, e.g. as defined in L. M. Barkovskii and G. N. Borzdov, "The impedance tensor for electromagnetic waves in anisotropic media," J. Appl. Spect. 20, 836 (1974) (herein incorporated by reference). In some embodiments an impedance-matching is a substantial matching of every matrix element of the wave impedance tensor (i.e. to provide a substantially nonreflective interface for all incident polarizations); in other embodiments an impedance-matching is a substantial matching of only selected matrix elements of the wave impedance tensor (e.g. to provide a substantially non-reflective interface for a selected polarization only). In some embodiments, the adjacent medium defines a permittivity $\varepsilon_1$ and a permeability $\mu_1$, where either or both parameters may be substantially unity or substantially non-unity; the output surface region defines a permittivity $\varepsilon_2$ and a permeability $\mu_2$, where either or both parameters may be substantially unity or substantially non-unity; and the impedance-matching condition implies $$\frac{\varepsilon_2}{\varepsilon_1} \cong \frac{\mu_2}{\mu_1} \qquad (9)$$

where $\varepsilon_2$ and $\mu_2$ may be tensor quantities. Defining a surface normal direction and a surface parallel direction (e.g. depicted as elements 521 and 522, respectively, in FIGS. 5 and 6), some embodiments provide a output surface region that defines: a surface normal permittivity $\varepsilon_2^\perp$ corresponding to the surface normal direction and a surface parallel permittivity $\varepsilon_2^\parallel$ corresponding to the surface parallel direction; and/or a surface normal permeability $\mu_2^\perp$ corresponding to the surface normal direction and a surface parallel permeability $\mu_2^\parallel$ corresponding to the surface parallel direction; and the impedance-matching condition may imply (in addition to equation (9)) one or both of the following conditions:

$$\frac{\varepsilon_2^\perp}{\varepsilon_1} \cong \frac{\varepsilon_1}{\varepsilon_2^\parallel}, \frac{\mu_2^\perp}{\mu_1} \cong \frac{\mu_1}{\mu_2^\parallel}. \qquad (10)$$

Where the output surface region is a curved surface region (e.g. as in FIG. 6), the surface normal direction and the surface parallel direction can vary with position along the input surface region.

Some embodiments provide one or more electromagnetic emitters positioned within the actual field region of the focusing structure. In general, electromagnetic emitters, such as those depicted FIG. 1 and in other embodiments, are electromagnetic devices or materials operable to radiate or transmit electromagnetic energy. Electromagnetic emitters can include antennas (such as wire/loop antennas, horn antennas, reflector antennas, patch antennas, phased array antennas, etc.), electroluminescent emitters (such as light-emitting diodes, laser diodes, electroluminescent films/powders, etc.), cathodoluminescent emitters (cathode ray tubes, field emission displays, vacuum fluorescent displays, etc.), gas discharge emitters (plasma displays, fluorescent lamps, metal halide lamps, etc.), lasers and laser gain media, photoluminescent emitters (quantum dots, phosphor powders, fluorescent dyes/markers, etc.), incandescent emitters (incandescent lamps, halogen lamps, etc.), reflective/refractive/diffractive elements (such as micromirror arrays, microlenses, transmissive/reflective/transflective liquid crystals, etc.), various combinations or portions thereof (e.g. an LCD panel and backlight, or a single pixel of a plasma display), or any other devices/materials operable to produce and/or deliver electromagnetic energy. Some embodiments include a plurality of electromagnetic emitters positioned within the actual field region. A first example is a multiplet of emitters operable at a corresponding multiplet of wavelengths or wavelength bands, i.e. a first emitter operable at a first wavelength/wavelength band, a second emitter operable at a second wavelength/wavelength band, etc. A second example is a plane array of emitters or emitter multiplets positioned on an actual object plane of the focusing structure. A third example is a phased array of antennas. The plurality of emitters can be axially distributed (as in FIG. 1); for example, the extended depth of field may admit a plurality of parallel plane emitter arrays. As discussed earlier, a transverse extent of the emissive aperture of an emitter (or emitter multiplet) can provide an object resolution length in the transverse direction (e.g. 188 in FIG. 1), and may bear a relation to the depth of field (as in equations (4) and (7)).

In some embodiments the field-adjusting structure provides an extended depth of field for input electromagnetic energy at a selected frequency/frequency band and/or a selected polarization. The selected frequency or frequency band may be selected from a range that includes radio frequencies, microwave frequencies, millimeter- or submillimeter-wave frequencies, THz-wave frequencies, optical frequencies (e.g. variously corresponding to soft x-rays, extreme ultraviolet, ultraviolet, visible, near-infrared, infrared, or far infrared light), etc. The selected polarization may be a particular TE polarization (e.g. where the electric field is in a particular direction transverse to the axial direction, as with s-polarized electromagnetic energy), a particular TM polarization (e.g. where the magnetic field is in a particular direction transverse to the axial direction, as with p-polarized electromagnetic energy), a circular polarization, etc. (other embodiments provide an extended depth of field for output electromagnetic energy that is substantially the same extended depth of focus for any polarization, e.g. for unpolarized electromagnetic energy).

In other embodiments the field-adjusting structure provides a first extended depth of field for input electromagnetic energy at a first frequency and a second extended depth of field for input electromagnetic energy at a second frequency, where the second extended depth of field may be different than or substantially equal to the first extended depth of field. For embodiments that recite first and second frequencies, the first and second frequencies may be selected from the frequency categories in the preceding paragraph. Moreover, for these embodiments, the recitation of first and second frequencies may generally be replaced by a recitation of first and second frequency bands, again selected from the above frequency categories. These embodiments providing a field-adjusting structure operable at first and second frequencies may include a transformation medium having an adjustable response to electromagnetic radiation. For example, the transformation medium may have a response to electromagnetic radiation that is adjustable (e.g. in response to an external input or control signal) between a first response and a second response, the first response providing the first extended depth of field for input electromagnetic energy at the first frequency, and the second response providing the second extended depth of field for input electromagnetic energy at the second frequency. A transformation medium with an adjustable electromagnetic response may be implemented with variable metamaterials, e.g. as described in R. A. Hyde et al, supra. Other embodiments of a field-adjusting structure operable at first and second frequencies may include transformation medium having a frequency-dependent response to electromagnetic radiation, corresponding to frequency-dependent constitutive parameters. For example, the frequency-dependent response at a first frequency may provide a first extended depth of field for input electromagnetic energy at the first frequency, and the frequency-dependent response at a second frequency may provide second extended depth of field for input electromagnetic energy at the second frequency. A transformation medium having a frequency-dependent response to electromagnetic radiation can be implemented with artificially-structured materials such as metamaterials; for example, a first set of metamaterial elements having a response at the first frequency may be interleaved with a second set of metamaterial elements having a response at the second frequency.

In some embodiments the focusing structure has a first nominal depth of field for input electromagnetic energy at a first frequency and a second nominal depth of field for input electromagnetic energy at a second frequency, where the second nominal depth of field may be different than or substantially equal to the first nominal depth of field. Examples of focusing structures providing different first and second nominal depths of field include: dichroic lenses or mirrors, frequency-selective surfaces, diffractive gratings; metamaterials having a frequency-dependent response; etc.; or, generally, any focusing structure having a chromatic dispersion or aberration. A focusing structure that provides first and second nominal depths of field for output electromagnetic energy at first and second frequencies can be combined with a field-adjusting structure that provides first and second extended depths of field for input electromagnetic energy at the first and second frequencies. A particular embodiment provides different first and second nominal depths of field but substantially equal first and second extended depths of field (thus, for example, compensating for a chromatic aberration of the focusing structure).

Figure 7:
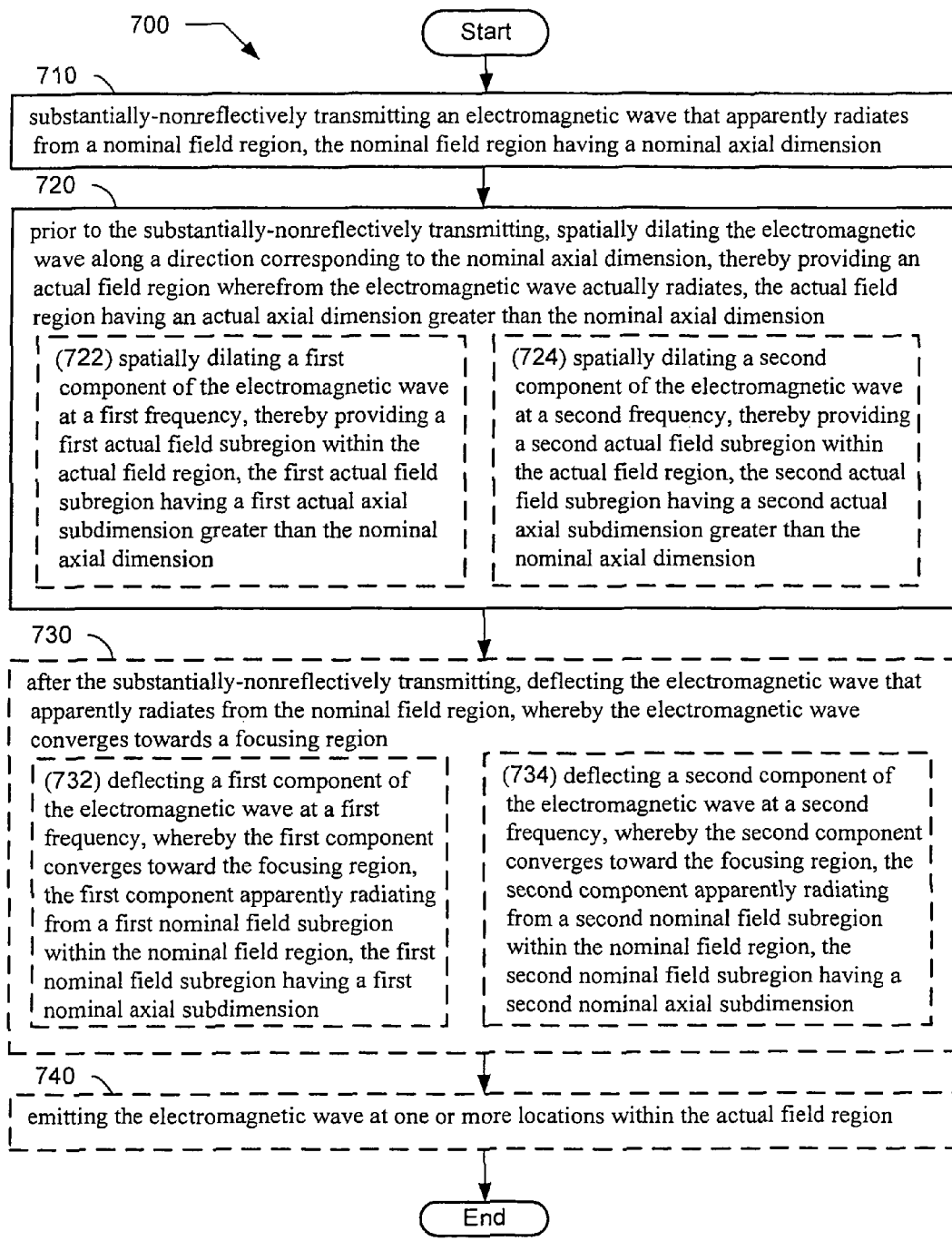
FIG. 7 depicts a first process flow.

An illustrative embodiment is depicted as a process flow diagram in FIG. 7. Flow 700 includes operation 710—substantially-nonreflectively transmitting an electromagnetic wave that apparently radiates from a nominal field region, the nominal field region having a nominal axial dimension. For example, a field-adjusting structure, such as that depicted as element 120 in FIGS. 5, and 6, may include an output surface region 510 that substantially-nonreflectively transmits electromagnetic energy from the field-adjusting structure to an adjacent region (e.g. where the output surface region is substantially impedance-matched to the adjacent region), and the substantially-nonreflectively transmitted electromagnetic energy may apparently radiate from a nominal field region, as indicated by the nominal rays 104 radiating from the nominal field region 130 in FIGS. 1 and 3. Flow 700 further includes operation 720—prior to the substantially-nonreflectively transmitting, spatially dilating the electromagnetic wave along a direction corresponding to the nominal axial dimension, thereby providing an actual field region wherefrom the electromagnetic wave actually radiates, the actual field region having an actual axial dimension greater than the nominal axial dimension. For example, a field-adjusting structure, such as that depicted as element 120 in FIGS. 1 and 3, may influence the propagation of input electromagnetic energy 102, whereby the input electromagnetic energy appears to radiate from nominal field region 130 but actually radiates from an actual field region 140; and the field-adjusting structure may include a transformation medium corresponding to a coordinate transformation that includes a spatial dilation, e.g. as depicted in FIGS. 2 and 4. Operation 720 optionally includes sub-operation 722—spatially dilating a first component of the electromagnetic wave at a first frequency, thereby providing a first actual field subregion within the actual field region, the first actual field subregion having a first actual axial subdimension greater than the nominal axial dimension—and sub-operation 724—spatially dilating a second component of the electromagnetic wave at a second frequency, thereby providing a second actual field subregion within the actual field region, the second actual field subregion having a second actual axial subdimension greater than the nominal axial dimension. For example, a field-adjusting structure may provide a first extended depth of field for input electromagnetic energy at a first frequency and a second extended depth of field for input electromagnetic energy at a second frequency, where the second extended depth of field may be different than or substantially equal to the first extended depth of field; and the field-adjusting structure operable at first and second frequencies may include a transformation medium having an adjustable response to electromagnetic radiation, or a transformation medium having a frequency-dependent response to electromagnetic radiation. Flow 700 optionally includes operation 730—after the substantially-nonreflectively transmitting, deflecting the electromagnetic wave that apparently radiates from the nominal field region, whereby the electromagnetic wave converges towards a focusing region. For example, a focusing structure, such as that depicted as element 110 in FIGS. 1 and 3, deflects input electromagnetic energy 102, whereby output electromagnetic energy 103 converges towards a nominal focusing region 180. Operation 730 optionally includes sub-operation 732—deflecting a first component of the electromagnetic wave at a first frequency, whereby the first component converges toward the focusing region, the first component apparently radiating from a first nominal field subregion within the nominal field region, the first nominal field subregion having a first nominal axial subdimension—and sub-operation 734—deflecting a second component of the electromagnetic wave at a second frequency, whereby the second component converges toward the focusing region, the second component apparently radiating from a second nominal field subregion within the nominal field region, the second nominal field subregion having a second nominal axial subdimension. For example, a focusing structure may provide a first nominal depth of field for input electromagnetic energy at a first frequency and a second nominal depth of field for input electromagnetic energy at a second frequency (e.g. where the focusing structure has a chromatic dispersion or aberration). Flow 700 optionally further includes operation 740—emitting the electromagnetic wave at one or more locations within the actual field region. For example, one or more electromagnetic emitters, such as those depicted as elements 150 in FIG. 1, may be positioned within an actual field region 140 to produce/deliver the input electromagnetic energy 103.

Figure 8:
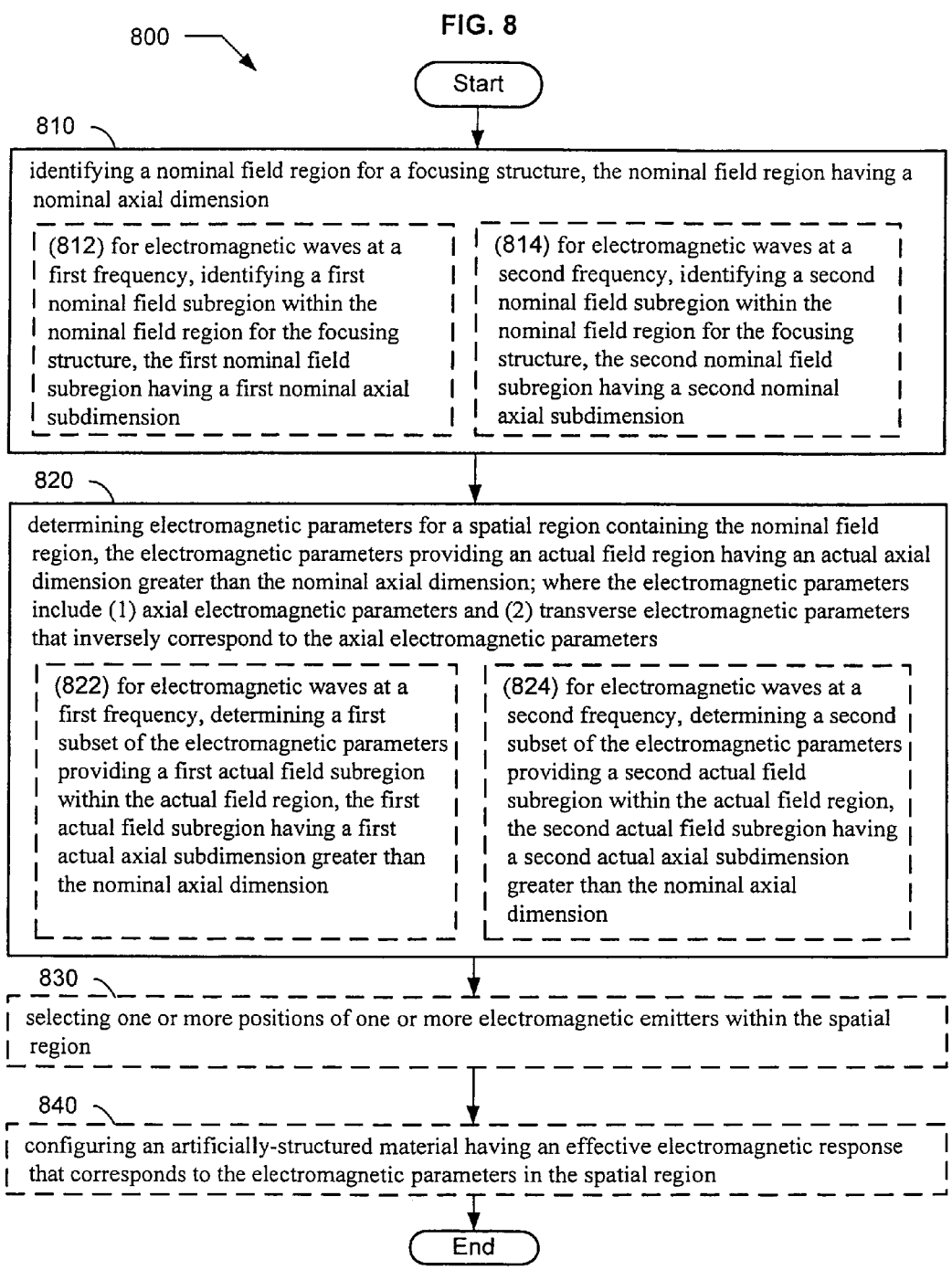
FIG. 8 depicts a second process flow.

Another illustrative embodiment is depicted as a process flow diagram in FIG. 8. Flow 800 includes operation 810—identifying a nominal field region for a focusing structure, the nominal field region having a nominal axial dimension. For example, a nominal field region is depicted as region 130 in FIGS. 1 and 3. The nominal field region may correspond to a region centered on a nominal object plane (or non-planar nominal object surface) having a thickness corresponding to a nominal depth of field. Operation 810 optionally includes sub-operation 812—for electromagnetic waves at a first frequency, identifying a first nominal field subregion within the nominal field region for the focusing structure, the first nominal field subregion having a first nominal axial subdimension—and sub-operation 814—for electromagnetic waves at a second frequency, identifying a second nominal field subregion within the nominal field region for the focusing structure, the second nominal field subregion having a second nominal axial subdimension. For example, the focusing structure may have a chromatic dispersion or aberration, whereby the nominal field region depends upon the frequency of the input electromagnetic energy. Flow 800 further includes operation 820—determining electromagnetic parameters for a spatial region containing the nominal field region, the electromagnetic parameters providing an actual field region having an actual axial dimension greater than the nominal axial dimension; where the electromagnetic parameters include (1) axial electromagnetic parameters and (2) transverse electromagnetic parameters that inversely correspond to the axial electromagnetic parameters. For example, the spatial region can be a volume that encloses a field-adjusting structure, such as that depicted as element 120 in FIGS. 1 and 3, and the determined electromagnetic parameters are the electromagnetic parameters of the field-adjusting structure. The field-adjusting structure may include a transformation medium, where the determined electromagnetic parameters satisfy or substantially satisfy equations (1) and (2), as described above; or, the determined electromagnetic parameters may be reduced parameters (as discussed earlier) where the corresponding non-reduced parameters satisfy equations (1) and (2). In some embodiments, the determining of the electromagnetic parameters includes: determining a coordinate transformation (such as those depicted in FIGS. 2 and 4); then determining electromagnetic parameters for a corresponding transformation medium (e.g. with equations (1) and (2)); then, optionally, reducing the electromagnetic parameters (e.g. to at least partially substitute a magnetic response for an electromagnetic response, or vice versa, as discussed above). Operation 820 optionally includes sub-operation 822—for electromagnetic waves at a first frequency, determining a first subset of the electromagnetic parameters providing a first actual field subregion within the actual field region, the first actual field subregion having a first actual axial subdimension greater than the nominal axial dimension—and sub-operation 824—for electromagnetic waves at a second frequency, determining a second subset of the electromagnetic parameters providing a second actual field subregion within the actual field region, the second actual field subregion having a second actual axial subdimension greater than the nominal axial dimension. For example, the determined electromagnetic parameters may be the electromagnetic parameters of a field-adjusting structure having a first extended depth of field for input electromagnetic energy at a first frequency and a second extended depth of field for input electromagnetic energy at a second frequency. The field-adjusting structure may include a transformation medium having an adjustable response to electromagnetic radiation, e.g. adjustable between a first response, corresponding to the first subset of the electromagnetic parameters, and a second response, corresponding to the second subset of the electromagnetic parameters. Or, the field-adjusting structure may include a transformation medium having a frequency-dependent response to electromagnetic radiation, corresponding to frequency-dependent constitutive parameters, so that the first and second subsets of the electromagnetic parameters are values of the frequency-dependent constitutive parameters at the first and second frequencies, respectively. Flow 800 optionally further includes operation 830—selecting one or more positions of one or more electromagnetic emitters within the spatial region. For example, electromagnetic emitters may be positioned in a phased array, an object plane array, an axially-distributed arrangement, etc. Flow 800 optionally further includes operation 840—configuring an artificially-structured material having an effective electromagnetic response that corresponds to the electromagnetic parameters in the spatial region. For example, the configuring may include configuring the structure(s) and/or the materials that compose a photonic crystal or a metamaterial. Operation 840 optionally includes determining an arrangement of a plurality of electromagnetically responsive elements having a plurality of individual responses, the plurality of individual responses composing the effective electromagnetic response. For example, the determining may include determining the positions, orientations, and individual response parameters (spatial dimensions, resonant frequencies, linewidths, etc.) of a plurality of metamaterial elements such as split-ring resonators, wire or nanowire pairs, etc. Operation 840 optionally includes configuring at least one electromagnetically-responsive structure to arrange a plurality of distributed electromagnetic responses, the plurality of distributed electromagnetic responses composing the effective electromagnetic response. For example, the configuring may include configuring the distribution of loads and interconnections on a transmission line network, configuring an arrangement of layers in a layered metamaterial, configuring a pattern of etching or deposition (as with a nano-fishnet structure), etc.

Figure 9:
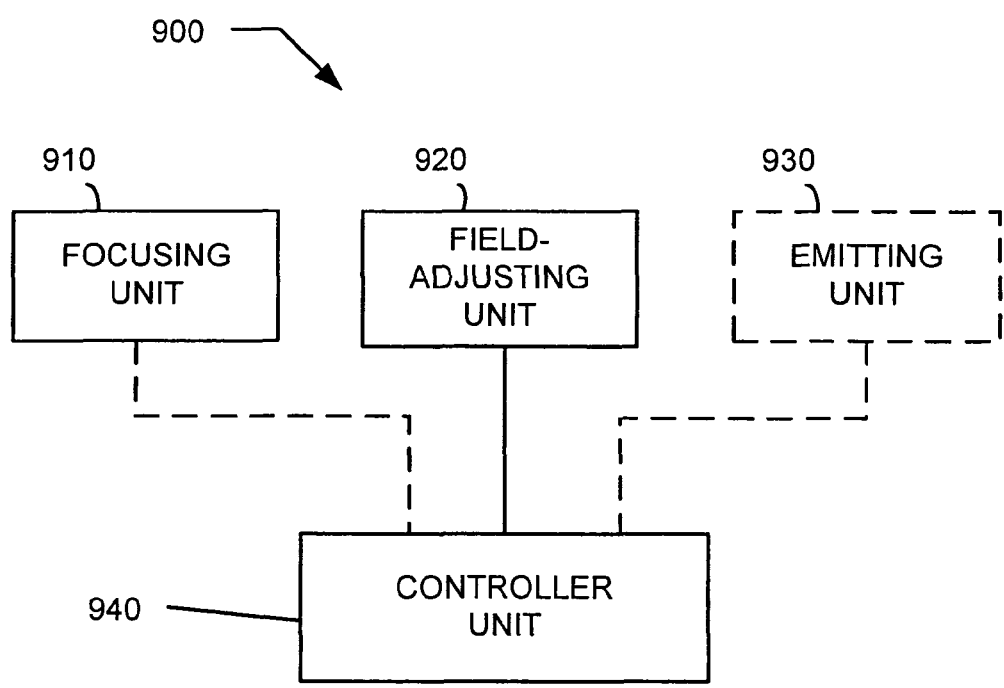
FIG. 9 depicts a system that includes a field-adjusting unit and a controller.

With reference now to FIG. 9, an illustrative embodiment is depicted as a system block diagram. The system 900 includes a focusing unit 910 optionally coupled to a controller unit 940. The focusing unit 910 may include a focusing structure such as that depicted as element 110 in FIGS. 1 and 3. The focusing structure may be a variable or adaptive focusing structure, such as an electro-optic lens, a liquid or liquid-crystal lens, a mechanically-adjustable lens assembly, a variable metamaterial lens, or any other variable or adaptive focusing structure responsive to one or more control inputs to vary or adapt one or more focusing characteristics (focal length, aperture size, nominal depth of field, operating frequency/frequency band, operating polarization, etc.) of the focusing structure; and the controller unit 940 may include control circuitry that provides one or more control inputs to the variable or adaptive focusing structure. The system 900 further includes a field-adjusting unit 920 coupled to the controller unit 940. The field-adjusting unit 920 may include a field-adjusting structure such as that depicted as element 120 in FIGS. 1 and 3. The field-adjusting structure may be a variable field-adjusting structure, such as a variable metamaterial responsive to one or more control inputs to vary one or more field-adjusting characteristics (extended depth of field, operating frequency/frequency band, operating polarization, effective coordinate transformation for a transformation medium, etc.); and the controller unit 940 may include control circuitry that provides one or more control inputs to the variable field-adjusting structure. The controller unit 940 may include circuitry for coordinating or synchronizing the operation of the focusing unit 910 and the field-adjusting unit 920; for example, the controller unit 940 may vary one or more focusing characteristics of a focusing structure (e.g. vary an operating frequency of the focusing structure from a first frequency to a second frequency) and correspondingly vary one or more field-adjusting characteristics of a field-adjusting structure (e.g. vary an operating frequency of the field-adjusting structure from a first frequency to a second frequency). The system 900 optionally further includes a emitting unit 930 that may include one or more emitters, such as those depicted as elements 150 in FIG. 1, and associated circuitry such as transmitter circuitry and/or signal processing circuitry. The emitting unit 930 is optionally coupled to the controller unit 940, and in some embodiments the controller unit 940 includes circuitry that controls the emitting unit and correspondingly varies the focusing characteristics of a focusing structure and/or varies the field-adjusting characteristics of a field-adjusting structure. As a first example, the controller unit 940 may select a transmitter frequency for the emitting unit 930, adjust the focusing unit 910 to an operating frequency substantially equal to the transmitter frequency, and/or adjust the focus-adjusting unit 920 to an operating frequency substantially equal to the transmitter frequency. As a second example, the controller unit may operate one or more selected emitters—the one or more selected emitters having a particular axial extent—and correspondingly vary an actual field region (such as region 140 in FIGS. 1 and 3) to enclose the particular axial extent, by varying the focusing characteristics of a focusing structure and/or varying the field-adjusting characteristics of a field-adjusting structure.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

All of the above U.S. patents, U.S. patent application publications, U.S. patent applications, foreign patents, foreign patent applications and non-patent publications referred to in this specification and/or listed in any Application Data Sheet, are incorporated herein by reference, to the extent not inconsistent herewith.

One skilled in the art will recognize that the herein described components (e.g., steps), devices, and objects and the discussion accompanying them are used as examples for the sake of conceptual clarity and that various configuration modifications are within the skill of those in the art. Consequently, as used herein, the specific exemplars set forth and the accompanying discussion are intended to be representative of their more general classes. In general, use of any specific exemplar herein is also intended to be representative of its class, and the non-inclusion of such specific components (e.g., steps), devices, and objects herein should not be taken as indicating that limitation is desired.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

With respect to the appended claims, those skilled in the art will appreciate that recited operations therein may generally be performed in any order. Examples of such alternate orderings may include overlapping, interleaved, interrupted, reordered, incremental, preparatory, supplemental, simultaneous, reverse, or other variant orderings, unless context dictates otherwise. With respect to context, even terms like "responsive to," "related to," or other past-tense adjectives are generally not intended to exclude such variants, unless context dictates otherwise.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method, comprising:
    at an output surface region of an artificially-structured material, substantially-nonreflectively transmitting an electromagnetic wave that apparently radiates from a nominal field region, the nominal field region having a nominal axial dimension; and
    prior to the substantially-nonreflectively transmitting, spatially dilating the electromagnetic wave along a direction corresponding to the nominal axial dimension, thereby providing an actual field region wherefrom the electromagnetic wave actually radiates, the actual field region having an actual axial dimension greater than the nominal axial dimension.

2. The method of claim 1, wherein the electromagnetic wave is a polarized electromagnetic wave.

3. The method of claim 2, wherein the polarized electromagnetic wave is a TE-polarized electromagnetic wave.

4. The method of claim 2, wherein the polarized electromagnetic wave is a TM-polarized electromagnetic wave.

5. The method of claim 1, wherein the electromagnetic wave is an unpolarized electromagnetic wave.

6. The method of claim 1, wherein the electromagnetic wave is at a first frequency.

7. The method of claim 6, where the first frequency is an optical frequency.

8. The method of claim 7, wherein the optical frequency corresponds to a visible wavelength.

9. The method of claim 7, wherein the optical frequency corresponds to an infrared wavelength.

10. The method of claim 6, wherein the first frequency is a radio frequency.

11. The method of claim 10, wherein the radio frequency is a microwave frequency.

12. The method of claim 6, wherein the first frequency is a millimeter-wave frequency.

13. The method of claim 6, wherein the first frequency is a submillimeter-wave frequency.

14. The method of claim 1, wherein the spatially dilating includes:
    spatially dilating a first component of the electromagnetic wave at a first frequency, thereby providing a first actual field subregion within the actual field region, the first actual field subregion having a first actual axial subdimension greater than the nominal axial dimension; and
    spatially dilating a second component of the electromagnetic wave at a second frequency, thereby providing a second actual field subregion within the actual field region, the second actual field subregion having a second actual axial subdimension greater than the nominal axial dimension.

15. The method of claim 14, wherein the second actual axial subdimension is different than the first actual axial subdimension.

16. The method of claim 14, wherein the second actual axial subdimension is substantially equal to the first actual axial subdimension.

17. The method of claim 1, further comprising:
    after the substantially-nonreflectively transmitting, deflecting the electromagnetic wave that apparently radiates from the nominal field region, whereby the electromagnetic wave converges towards a focusing region.

18. The method of claim 17, wherein the deflecting includes:
    deflecting a first component of the electromagnetic wave at a first frequency, whereby the first component converges toward the focusing region, the first component apparently radiating from a first nominal field subregion within the nominal field region, the first nominal field subregion having a first nominal axial subdimension; and deflecting a second component of the electromagnetic wave at a second frequency, whereby the second component converges toward the focusing region, the second component apparently radiating from a second nominal field subregion within the nominal field region, the second nominal field subregion having a second nominal axial subdimension.

19. The method of claim 18, wherein the spatially dilating includes:
spatially dilating the first component, thereby providing a first actual field subregion within the actual field region, the first actual field subregion having a first actual axial subdimension greater than the first nominal axial subdimension; and
spatially dilating the second component, thereby providing a second actual field subregion within the actual field region, the second actual field subregion having a second actual axial dimension greater than the second nominal axial subdimension.

20. The method of claim 19, wherein the second nominal axial subdimension is different than the first nominal axial subdimension.

21. The method of claim 20, wherein the second actual axial subdimension is substantially equal to the first actual axial subdimension.

22. The method of claim 19, wherein the second nominal axial subdimension is substantially equal to the first nominal axial subdimension.

23. The method of claim 17, wherein the deflecting includes refracting.

24. The method of claim 17, wherein the deflecting includes reflecting.

25. The method of claim 17, wherein the deflecting includes diffracting.

26. The method of claim 17, wherein the deflecting includes waveguiding.

27. The method of claim 1, further comprising:
emitting the electromagnetic wave at one or more locations within the actual field region.

28. The method of claim 27, wherein the emitting includes emitting with at least one antenna.

29. The method of claim 27, wherein the emitting includes luminescent emitting.

30. The method of claim 27, wherein the emitting includes incandescent emitting.

31. The method of claim 27, wherein the one or more locations is a plurality of locations.

32. The method of claim 31, wherein the plurality of locations is an axially distributed plurality of locations.

33. The method of claim 31, wherein the emitting includes emitting with a plurality of antennas.

34. The method of claim 33, wherein the plurality of antennas composes an antenna phased array.

35. The method of claim 1, wherein the nominal field region is a first substantially planar slab and the nominal axial dimension is a thickness of the first substantially planar slab.

36. The method of claim 35, wherein the actual field region is a second substantially planar slab substantially parallel to the first substantially planar slab, and the actual axial dimension is a thickness of the second substantially planar slab.

37. The method of claim 36, wherein the second substantially planar slab encloses the first substantially planar slab.

38. The method of claim 1, wherein the nominal field region is at least a portion of a first curved slab and the nominal axial dimension is a thickness of the first curved slab.

39. The method of claim 38, wherein the actual field region is at least a portion of a second curved slab, the first and second curved slabs having a substantially similar curvature, and the actual axial dimension is a thickness of the second curved slab.

40. The method of claim 39, wherein the second curved slab encloses the first curved slab.

41. The method of claim 38, wherein the first curved slab is a substantially cylindrical shell and the nominal axial dimension is a radial dimension of the substantially cylindrical shell.

42. The method of claim 38, wherein the first curved slab is a substantially spherical shell and the nominal axial dimension is a radial dimension of the substantially spherical shell.

43. The method of claim 38, wherein the first curved slab is a substantially ellipsoidal shell.

44. The method of claim 1, wherein the substantially-nonreflectively transmitting is a substantially-nonreflectively refracting.

45. The method of claim 44, wherein the substantially-nonreflectively refracting is substantially-nonreflectively refracting by wave-impedance matching.

46. The method of claim 1, wherein the spatially dilating is spatially dilating with a uniform scale factor.

47. The method of claim 1, wherein the spatially dilating is spatially dilating with a non-uniform scale factor.

48. The method of claim 1, wherein the spatially dilating is spatially dilating by propagating the electromagnetic wave in the artificially-structured material.

49. The method of claim 48, wherein the spatially dilating is spatially dilating with a uniform scale factor.

50. The method of claim 48, wherein the spatially dilating is spatially dilating with a non-uniform scale factor.

51. The method of claim 50, wherein the non-uniform scale factor corresponds to a non-uniform refractive index of the artificially-structured material.

52. The method of claim 48, wherein the artificially-structured material is a transformation medium.

53. The method of claim 1, wherein the artificially-structured material includes a metamaterial.

* * * * *